(12) United States Patent
Sakai et al.

(10) Patent No.: US 10,816,755 B2
(45) Date of Patent: Oct. 27, 2020

(54) VARIABLE FOCAL LENGTH LENS DEVICE

(71) Applicant: MITUTOYO CORPORATION, Kanagawa (JP)

(72) Inventors: Hiroshi Sakai, Kanagawa (JP); Yutaka Watanabe, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 212 days.

(21) Appl. No.: 15/951,599

(22) Filed: Apr. 12, 2018

(65) Prior Publication Data

US 2018/0314033 A1 Nov. 1, 2018

(30) Foreign Application Priority Data

Apr. 28, 2017 (JP) .................. 2017-089578

(51) Int. Cl.
*G02B 7/10* (2006.01)
*G02B 15/14* (2006.01)
*H04N 5/232* (2006.01)
*G06F 3/048* (2013.01)
*G02B 15/04* (2006.01)
*G02B 7/04* (2006.01)
*G02B 3/14* (2006.01)
*H04N 5/225* (2006.01)

(52) U.S. Cl.
CPC .............. *G02B 7/102* (2013.01); *G02B 3/14* (2013.01); *G02B 7/04* (2013.01); *G02B 15/04* (2013.01); *G02B 15/14* (2013.01); *G06F 3/048* (2013.01); *H04N 5/23203* (2013.01); *H04N 5/23216* (2013.01); *H04N 5/2254* (2013.01); *H04N 5/2256* (2013.01)

(58) Field of Classification Search
CPC .. G02B 19/0028; G02B 26/005; G02B 27/09; G02B 3/0081; G02B 3/14; G02B 7/008
See application file for complete search history.

(56) References Cited

U.S. PATENT DOCUMENTS 9,961,253 B2 * 5/2018 Bryll ................. H04N 5/23216
2010/0177376 A1 7/2010 Arnold et al.
(Continued)

OTHER PUBLICATIONS

U.S. Appl. No. 15/947,144 to Igasaki et al., which was filed Apr. 6, 2018.
(Continued)

*Primary Examiner* — Joseph P Martinez
*Assistant Examiner* — Vipin Patel
(74) *Attorney, Agent, or Firm* — Greenblum & Bernstein, P.L.C.

(57) ABSTRACT

A variable focal length lens device includes: a lens system whose refractive index is variable in response to an inputted drive signal; an image detector for detecting an image of a target object through the lens system; a lens controller for outputting the drive signal and an illumination signal; and a lens operation unit for adjusting a frequency and amplitude of the drive signal outputted by the lens controller and an image-detection timing for the image detector. The lens controller includes a resonance-lock controller for tuning the drive signal to a resonance frequency of the lens system. The lens operation unit includes a resonance-lock operation unit for switchably enabling and suspending the resonance-lock controller.

3 Claims, 26 Drawing Sheets

(56) References Cited

U.S. PATENT DOCUMENTS

| | | |
|---|---|---|
| 2017/0013185 A1* | 1/2017 | Gladnick .......... H04N 5/23212 |
| 2017/0285318 A1 | 10/2017 | Cho et al. |
| 2018/0180773 A1 | 6/2018 | Usami et al. |
| 2018/0180774 A1 | 6/2018 | Nagahama et al. |

OTHER PUBLICATIONS

U.S. Appl. No. 15/947,088 to Shiro Igasaki et al., which was filed Apr. 6, 2018.

* cited by examiner

VARIABLE FOCAL LENGTH LENS DEVICE

The entire disclosure of Japanese Patent Application No. 2017-089578 filed Apr. 28, 2017 is expressly incorporated by reference herein.

TECHNICAL FIELD

The present invention relates to a variable focal length lens device.

BACKGROUND ART

A variable focal length lens device employing, for instance, a liquid lens system (simply referred to as a "lens system" hereinafter) based on a principle disclosed in Patent Literature 1 (U.S. Pre-Grant Patent Publication No. 2010/0177376) has been developed.

The lens system includes a cylindrical oscillator made of a piezoelectric material that is immersed in a transparent liquid. When an alternating-current (AC) voltage is applied to an inner circumferential surface and an outer circumferential surface of the oscillator of the lens system, the oscillator expands and contracts in a thickness direction thereof to oscillate the liquid inside the oscillator. Then, when the frequency of the applied AC voltage is tuned to an intrinsic frequency of the liquid, a concentric standing wave is created in the liquid to form concentric regions of different refractive indexes around a center axis of the oscillator. Accordingly, when light is introduced into the oscillator of the lens system along the center axis of the oscillator, the light follows a diffusing or converging path according to the refractive index of each of the concentric regions.

The variable focal length lens device includes the above-described lens system and a focusing objective lens (e.g. a typical convex lens or lens group), which are disposed on a common optical axis.

When a parallel light enters a typical objective lens, the light having passed through the lens is focused at a focus position located at a predetermined focal length from the lens. In contrast, when a parallel light enters the lens system disposed coaxially with the objective lens, the light is diffused or converged by the lens system, so that the light having passed through the objective lens is focused at a position closer or farther than the original focus position (i.e. the focus position without the lens system).

Accordingly, an amplitude of a drive signal (an AC voltage of a frequency forming a standing wave in the liquid inside the lens system) inputted to the lens system is increased or decreased in the variable focal length lens device, thereby controlling the focus position of the variable focal length lens device as desired within a predetermined range (i.e. a range with a predetermined variation width capable of being added to/subtracted from the focal length of the objective lens using the lens system).

A sinusoidal AC signal is exemplarily used for the drive signal inputted to the lens system of the variable focal length lens device. When such a sinusoidal drive signal is inputted, the focal length (focus position) of the variable focal length lens device sinusoidally changes. At this time, when the voltage value of the drive signal is 0, the light passing through the lens system is not refracted and the focal length of the variable focal length lens device becomes equal to the focal length of the objective lens. When the voltage of the drive signal is at a positive or negative peak, the light passing through the lens system is most greatly refracted and the focal length of the variable focal length lens device is most deviated from the focal length of the objective lens.

In order to obtain an image using the variable focal length lens device, an illumination signal is outputted in synchronization with a phase of the sine wave of the drive signal to perform a pulsed illumination. Such pulsed illumination on an object at a desired focal length among the sinusoidally changing focal lengths allows for detection of the image of the object at the focal length. When the pulsed illumination is performed at a plurality of phases in one cycle and the image is detected at a timing corresponding to each of the phases, images at a plurality of focal lengths can be obtained in the cycle.

In the variable focal length lens device, a temperature of the liquid inside the above-described lens system and a temperature of the oscillator change by being affected by an ambient temperature and/or a heat generated as a result of the operation of the lens system. An intrinsic frequency also changes due to the temperature change, resulting in a change in a frequency (resonance frequency) of the AC signal forming the standing wave. If the drive signal inputted to the lens system remains the same as the drive signal before the temperature change, the drive signal is deviated from a peak of the resonance frequency, thus failing to efficiently form the standing wave.

A resonance-lock system, which allows the drive signal to be automatically locked to the changed resonance frequency, has thus been used. For instance, it is supposed that a drive signal of a predetermined frequency, at which an intensity level of the standing wave is maximized, is inputted to the lens system. If the level of the standing wave is declined, it is determined that the frequency of the drive signal is deviated from the peak of the resonance capable of forming the standing wave in the lens system, and the frequency of the drive signal is tuned to a new peak position by raising or lowering the frequency of the drive signal. When the frequency of the drive signal reaches the new peak position, the level of the standing wave can be restored to the maximum intensity. Such tuning to the peak position is continuously conducted to achieve the automatic locking (resonance lock) to the resonance frequency, at which the standing wave is formed.

It is necessary for the above-described variable focal length lens device to be supplied with an appropriately tuned drive signal. Specifically, the drive signal, which is primarily determined by a signal generator or the like capable of outputting a sinusoidal wave, has to be adjusted and controlled by some units in terms of transmission frequency, output level and the like depending on the lens system. In addition, a timing adjustment for outputting the illumination signal to the pulsed light illuminator (i.e. phase adjustment of the drive signal) is necessary in order to set the focal length for capturing the image. The resonance lock also requires an appropriate adjustment or control.

In order to address the above requests, a unit capable of appropriately performing the control sating and/or operation of the lens system and pulsed light illuminator has been demanded.

SUMMARY OF THE INVENTION

An object of the invention is to provide a variable focal length lens device capable of appropriately setting control items of a lens system and a pulsed light illuminator and appropriately operating the lens system and the pulsed light illuminator.

A variable focal length lens device according to an aspect of the invention includes: a lens system whose refractive index is variable depending on an inputted drive signal; an objective lens disposed in an optical axis common to the lens system; an image detector configured to detect an image of a target object through the lens system and the objective lens; a lens controller configured to output the drive signal; and a lens operation unit configured to adjust a frequency, an amplitude and a maximum drive voltage of the drive signal outputted by the lens controller, in which the lens controller includes a resonance-lock controller configured to lock the frequency of the drive signal to a resonance frequency of the lens system, and the lens operation unit includes a resonance-lock operation unit configured to switch enabling and suspending the resonance-lock controller.

According to the above aspect of the invention, while the standing wave is formed in the lens system in response to the drive signal from the lens controller (resonant state), the image detector detects the image at a predetermined image-detection timing to obtain the image at a desired focal length. Further, when the resonance-lock operation unit enables the resonance-lock controller, the frequency of the drive signal is automatically tuned to the peak of the current resonance frequency of the lens system to efficiently form the standing wave.

At this time, the drive signal and the image-detection timing can be set or adjusted by the lens operation unit. Further, the enabling and suspending of the resonance-lock control can be conducted by the lens operation unit.

In the variable focal length lens device according to the above aspect of the invention, it is preferable that the lens controller is in a form of a dedicated hardware, and the lens operation unit is in a form of a computer system configured to run a dedicated software.

In the above arrangement, the lens controller is constructed as a dedicated hardware so that the components for directly controlling the operation of the lens system and the pulsed light illuminator (i.e. controlling the frequency and amplitude, controlling the maximum drive voltage and the like) can be concentrated in the dedicated hardware. On the other hand, the lens controller is controlled using the lens operation unit in a form of the versatile personal computer, which runs a dedicated software to achieve operations for each of the functions and is adapted to be easily modified in accordance with the application of the lens operation unit.

In the variable focal length lens device according to the above aspect of the invention, it is preferable that the lens operation unit further includes an operation interface, the operation interface includes a main screen, a setting portion for the frequency and the amplitude of the drive signal, and an operation portion for enabling and suspending the resonance-lock controller, the setting portion and the operation portion being displayed on the main screen, and a setting portion for an image-detection timing of the image detector and a setting portion for the maximum drive voltage of the drive signal are each displayed on a sub screen independent of the main screen.

In the above arrangement, the setting of the frequency and the amplitude of the drive signal, and enabling/disabling of the resonance-lock controller, which are often used during the operation of the lens system, can be done on the usually displayed main screen. In contrast, the setting of the image-detection timing of the image detector (setting of the synchronization output signal control) and the setting of the maximum drive voltage of the drive signal, which are not likely to be changed after once being set, are made on the sub screens. Accordingly, the screen space can be efficiently used and unintended operation can be prevented.

According to the invention, a variable focal length lens device capable of appropriately setting control items of a lens system and a pulsed light illuminator and appropriately controlling the lens system and the pulsed light illuminator can be provided.

BRIEF DESCRIPTION OF DRAWING(S)

FIG. 24 illustrates an optical-setting sub screen of the image-processing software in the exemplary embodiment.

DESCRIPTION OF EMBODIMENT(S)

Exemplary embodiment(s) of the invention will be described below with reference to the attached drawings.

Figure 1:
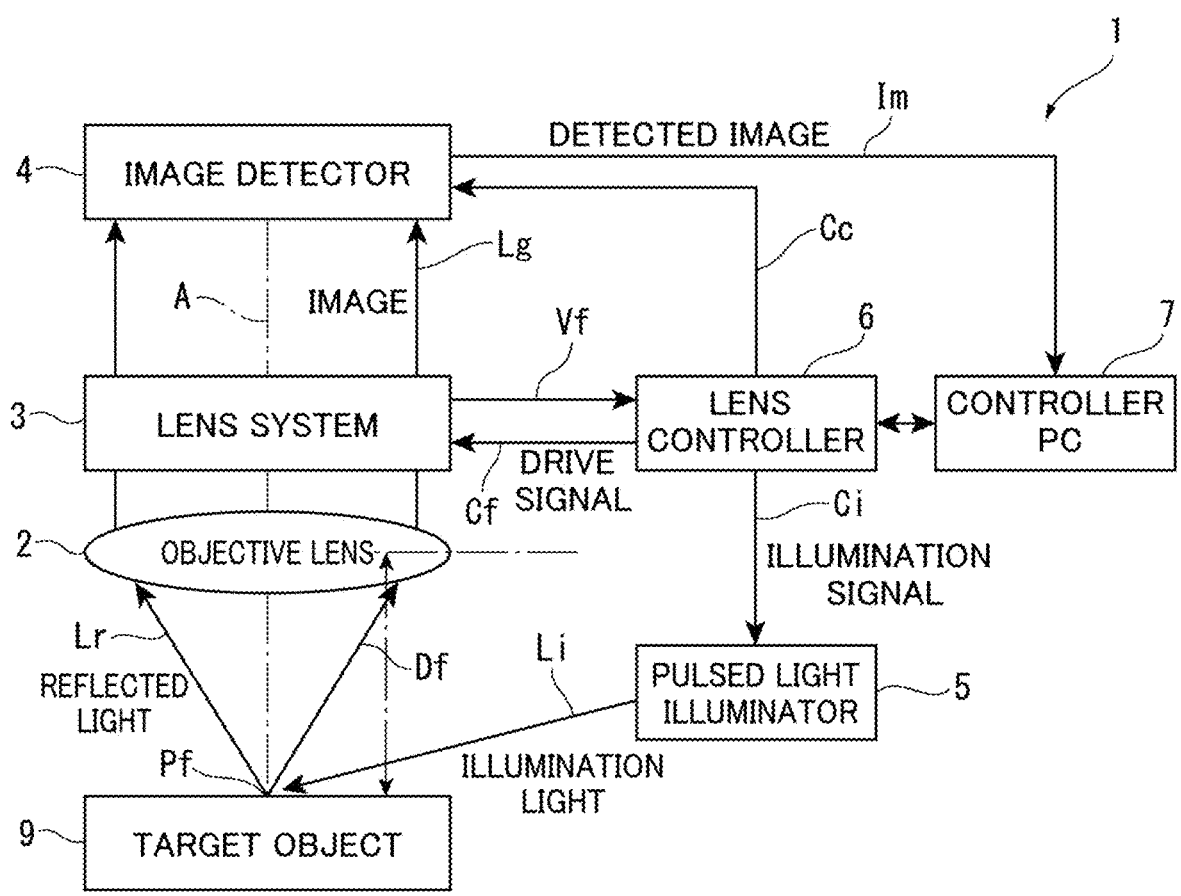
FIG. 1 is a schematic illustration showing an exemplary embodiment of the invention.

As shown in FIG. 1, in order to detect an image of a surface of a target object 9 while changing a focal length, a variable focal length lens device 1 includes: an objective lens 2; a lens system 3; and an image detector 4, the objective lens 2, the lens system 3 and the image detector 4 being disposed on a common optical axis A intersecting the surface of the target object 9.

The variable focal length lens device 1 further includes: a pulsed light illuminator 5 configured to apply pulsed illumination on the surface of the target object 9; a lens controller 6 configured to control operations of the lens system 3 and the pulsed light illuminator 5; and a controller PC 7 configured to operate the lens controller 6.

An existing personal computer is used as the controller PC 7. The desired function of the controller PC 7 is achieved by running a predetermined control software on the controller PC 7. The controller PC 7 is also configured to import and process an image from the image detector 4.

An existing convex lens is used as the objective lens 2.

The image detector 4 includes an existing charge coupled device (CCD) image sensor, other type of a camera or the like, and is configured to receive an image Lg and output the image Lg to the controller PC 7 in a form of a detected image Im of a predetermined format.

The pulsed light illuminator 5 includes a light-emitting element such as a light emitting diode (LED). The pulsed light illuminator 5 is configured to emit an illumination light Li only for a predetermined time to apply the pulsed illumination on the surface of the target object 9 when an illumination signal Ci is inputted from the lens controller 6.

The lens system 3 is configured to change a refractive index thereof depending on a drive signal Cf inputted by the lens controller 6. The drive signal Cf is a sinusoidal AC signal of a frequency capable of forming a standing wave in the lens system 3.

A focal length Df to a focus position Pf of the variable focal length lens device 1 can be changed as desired based on a focal length of the objective lens 2 by changing the refractive index of the lens system 3.

Figure 2:
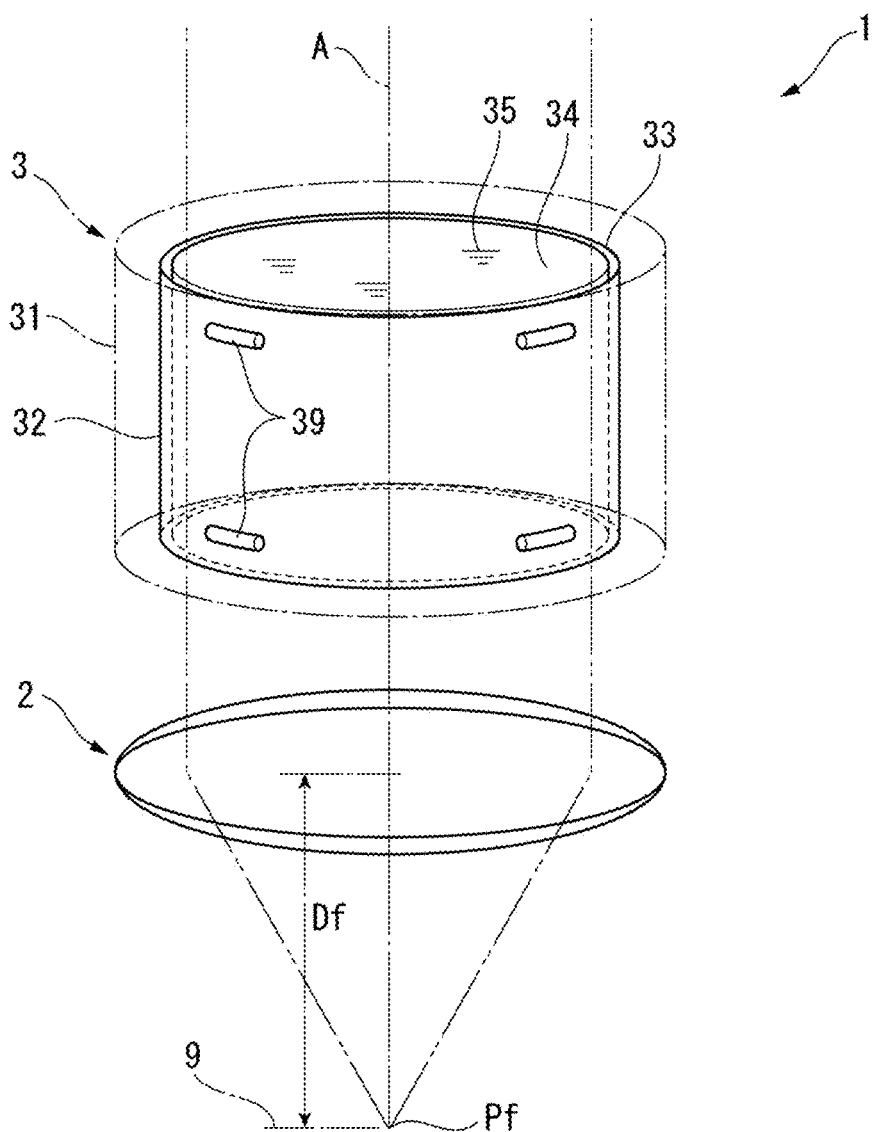
FIG. 2 is a schematic illustration showing an arrangement of a lens system according to the exemplary embodiment.

As shown in FIG. 2, the lens system 3 includes a cylindrical case 31 and a cylindrical oscillator 32 disposed inside the case 31. The oscillator 32 includes an outer circumferential surface 33 and is supported by an elastomeric spacer 39 interposed between the outer circumferential surface 33 and an inner circumferential surface of the case 31.

The oscillator 32 is a cylindrical component made from a piezoelectric material. The oscillator 32 is configured to oscillate in a thickness direction thereof when the AC voltage of the drive signal Cf is applied between the outer circumferential surface 33 and an inner circumferential surface 34 of the oscillator 32.

A highly transparent liquid 35 is filled in the case 31. The oscillator 32 is entirely immersed in the liquid 35 and an interior of the cylindrical oscillator 32 is filled with the liquid 35. The frequency of the AC voltage of the drive signal Cf is tuned to a frequency capable of forming a standing wave in the liquid 35 inside the oscillator 32.

Figure 3:
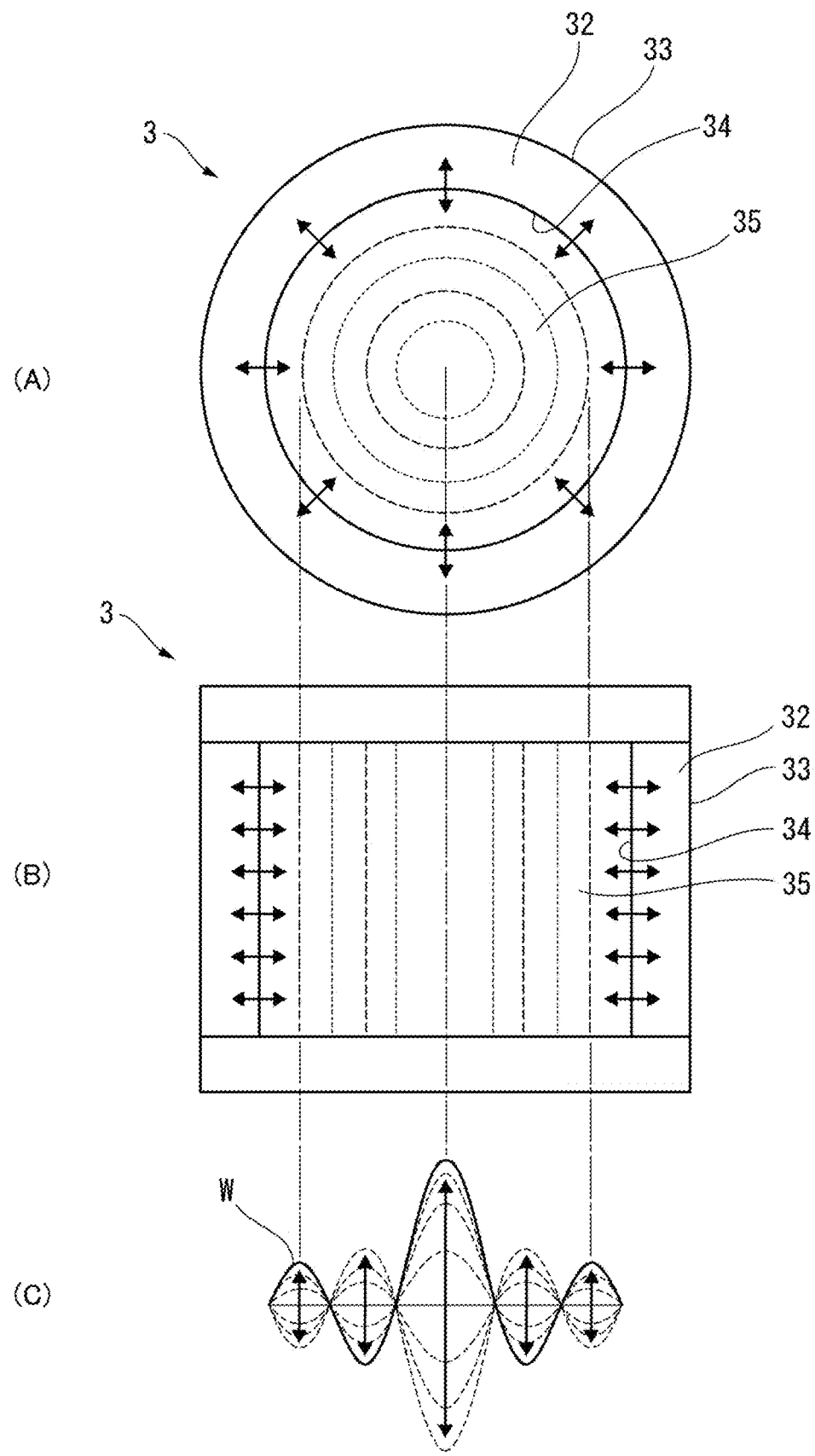
FIG. 3 is a schematic illustration showing an oscillating state of the lens system according to the exemplary embodiment.

As shown in FIG. 3, when the oscillator 32 is oscillated, a standing wave is formed in the liquid 35 in the lens system 3 to create concentric regions with alternating refractive indexes (see FIGS. 3(A) and 3(B)).

A relationship between a distance (radius) from a central axis of the lens system 3 and the refractive index of the liquid 35 at this time is represented by a refractive index distribution W shown in FIG. 3(C).

Figure 4:
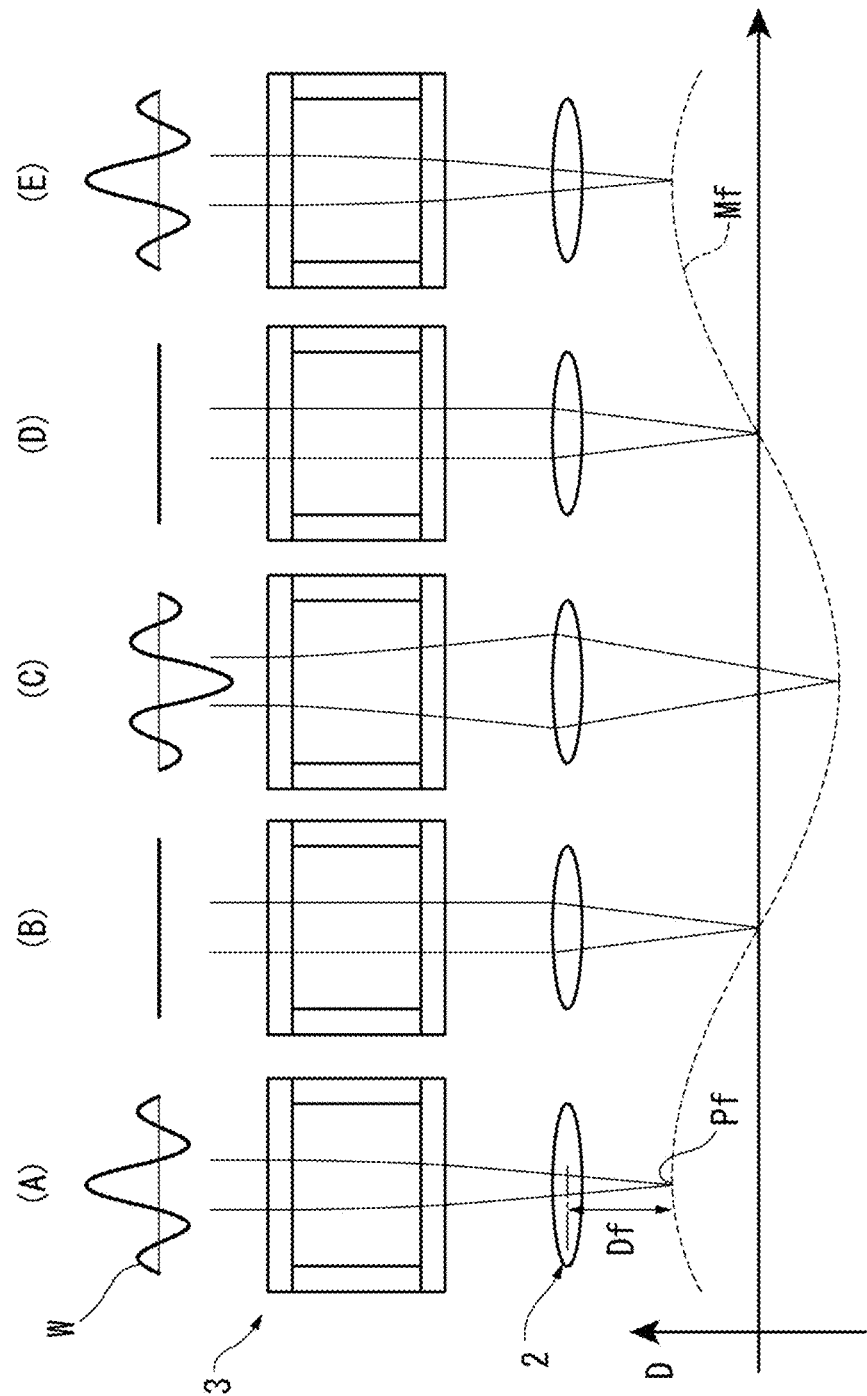
FIG. 4 is a schematic illustration showing a focal length of the lens system according to the exemplary embodiment.

As shown in FIG. 4, since the drive signal Cf is a sinusoidal AC signal, a variation width of the refractive index distribution W of the liquid 35 in the lens system 3 also changes in accordance with the drive signal Cf. The refractive index of the concentric regions formed in the liquid 35 sinusoidally changes to cause a sinusoidal variation in the focal length Df to the focus position Pf.

A difference between the maximum and minimum values in the refractive index distribution W is maximized in the state shown in FIG. 4(A), where the lens system 3 converges the light passing therethrough, the focus position Pf is located close to the lens system 3 and the focal length Df is shortest.

The refractive index distribution W is flat in the state shown in FIG. 4(B), where the lens system 3 lets the light through without refraction, and the focus position Pf and the focal length Df are at reference values.

The difference between the maximum and minimum values in the refractive index distribution W is maximized in the state shown in FIG. 4(C) with a polarity reverse to that in FIG. 4(A)), where the lens system 3 diffuses the light passing therethrough, the focus position Pf is located remote from the lens system 3 and the focal length Df is largest.

The refractive index distribution W is again flat in the state shown in FIG. 4(D), where the lens system 3 lets the light through without refraction, and the focus position Pf and the focal length Df are at the reference values.

The refractive index distribution W in FIG. 4(E) is returned to the state in FIG. 4(A), and the same variation in the refractive index distribution W will be repeated thereafter.

As described above, the drive signal Cf of the variable focal length lens device 1 is a sinusoidal AC signal and the focus position Pf and the focal length Df also sinusoidally changes as shown in a focus-position-variation waveform Mf in FIG. 4.

By applying the pulsed illumination on the target object 9 at the focus position Pf at a desired time in the focus-position-variation waveform Mf and detecting an image illuminated at this time, the image of the illuminated target object at the focus position Pf at a desired focal length Df (i.e. at a desired illumination timing) can be obtained.

Referring back to FIG. 1, the oscillation of the lens system 3, the illumination of the pulsed light illuminator 5 and the image-detection of the image detector 4 of the variable focal length lens device 1 are controlled based on the drive signal Cf, the illumination signal Ci and an image-detection signal Cc from the lens controller 6. The controller PC 7 is connected in order to, for instance, configure the setting of the lens controller 6 that controls the above components.

Figure 5:
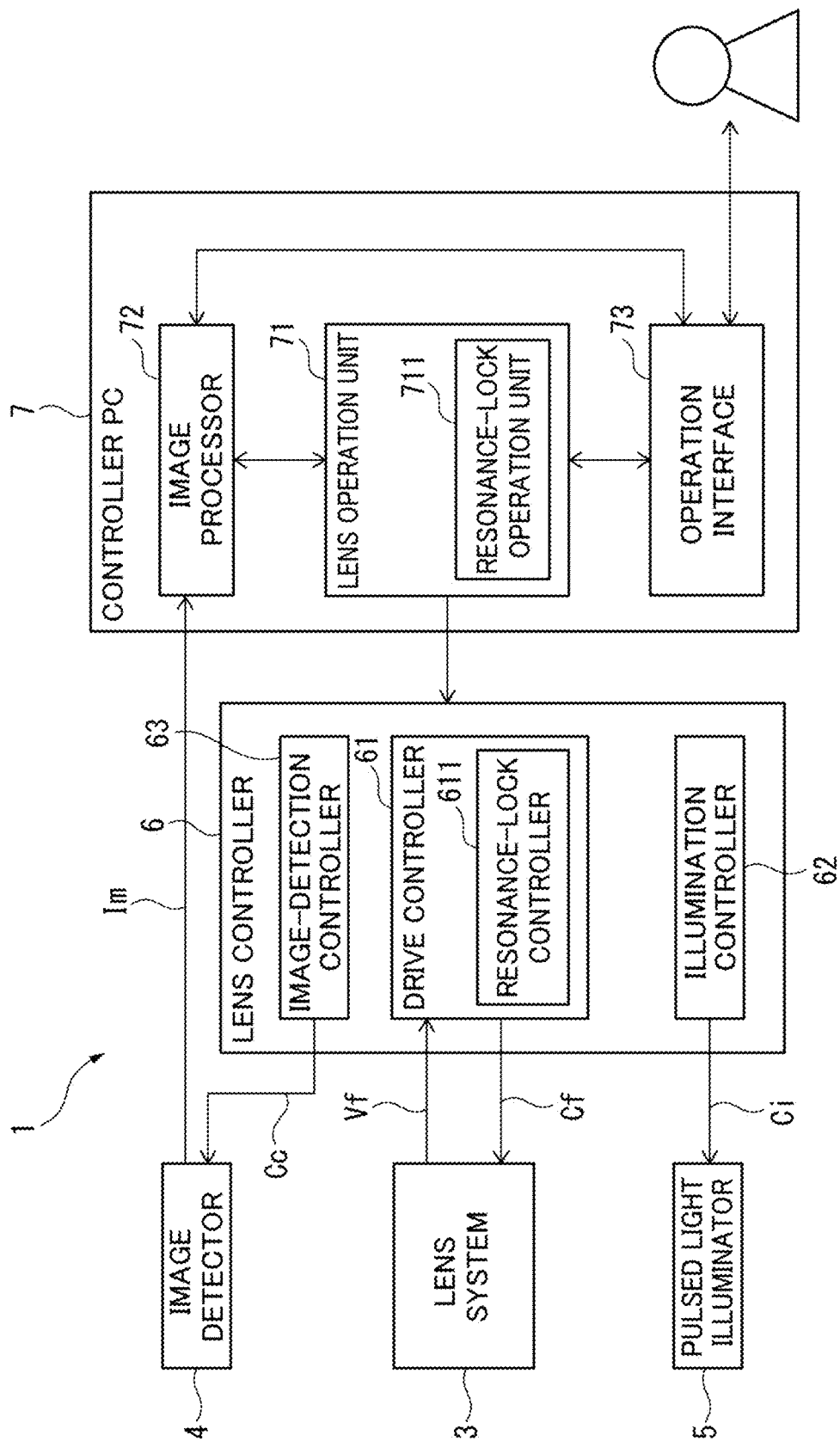
FIG. 5 is a block diagram showing a relevant part of the exemplary embodiment.

As shown in FIG. 5, the lens controller 6 includes: a drive controller 61 configured to output the drive signal Cf to the lens system 3; an illumination controller 62 configured to output the illumination signal Ci to the pulsed light illuminator 5; and an image-detection controller 63 configured to output the image-detection signal Cc to the image detector 4.

The drive controller 61 includes a resonance-lock controller 611.

The resonance-lock controller 611 is configured to detect oscillation conditions Vf of the lens system 3 based on an effective power Rp or a drive current Ri applied to the lens system 3 when the lens system 3 is oscillated in response to the inputted drive signal Cf. The resonance-lock controller 611 tunes the frequency of the drive signal Cf with reference to the oscillation conditions Vf of the lens system 3 to allow the frequency of the drive signal Cf to be locked to a current resonance frequency of the lens system 3. It should be noted that the oscillation conditions Vf may be detected by an oscillation sensor disposed in the lens system 3.

Figure 6:
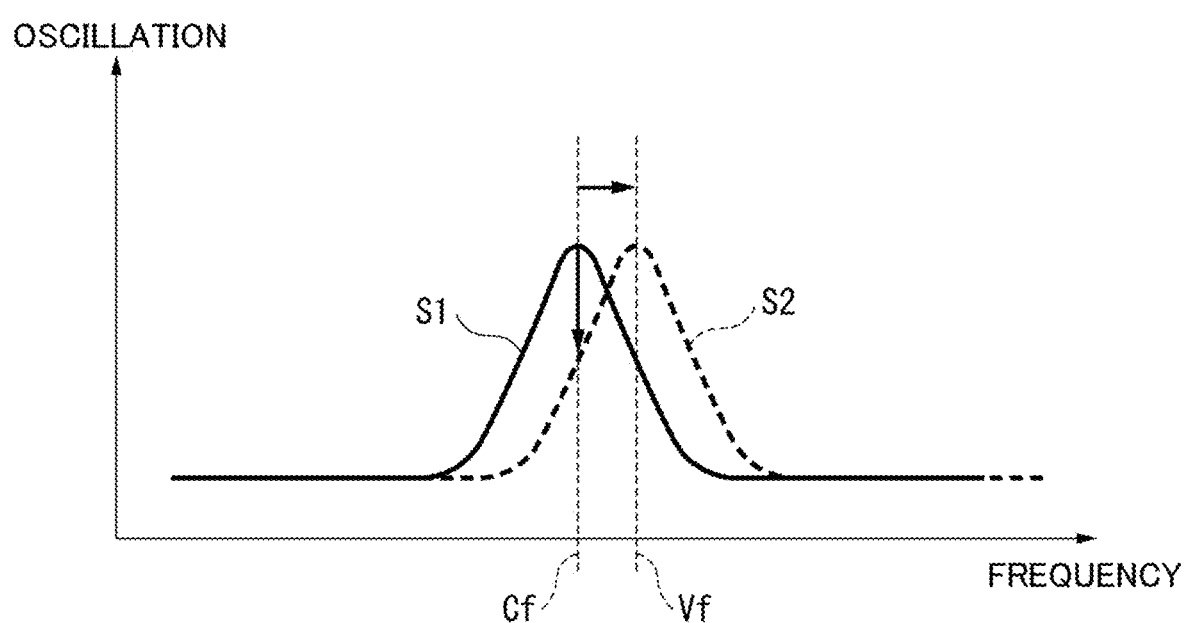
FIG. 6 is a graph showing a change in a resonance frequency in the exemplary embodiment.

Assuming that the oscillation characteristics of the lens system 3 are represented by S1 in FIG. 6, the frequency of the drive signal Cf is set at the peak of the oscillation characteristics S1. In the absence of any temperature change in the lens system 3, the frequency at the peak position of the oscillation characteristics of the lens system 3 detected by the resonance-lock controller 611 stays at the frequency at the peak of the oscillation characteristics S1 of the drive signal Cf.

With regard to the above, it is supposed that the oscillation characteristics of the lens system 3 are changed to S2 due to the temperature change and the like. Then, the oscillation characteristics of the lens system 3 detected by the resonance-lock controller 611 show a different peak (i.e. the peak of the oscillation characteristics S2), which is shifted from the peak of the drive signal Cf. If the drive signal Cf is inputted to the lens system 3 having the oscillation characteristics S2, the frequency of the drive signal Cf, which does not match the peak position of the oscillation characteristics S2, cannot provide sufficient effective power to the lens system 3, thereby decreasing the efficiency.

Figure 7:
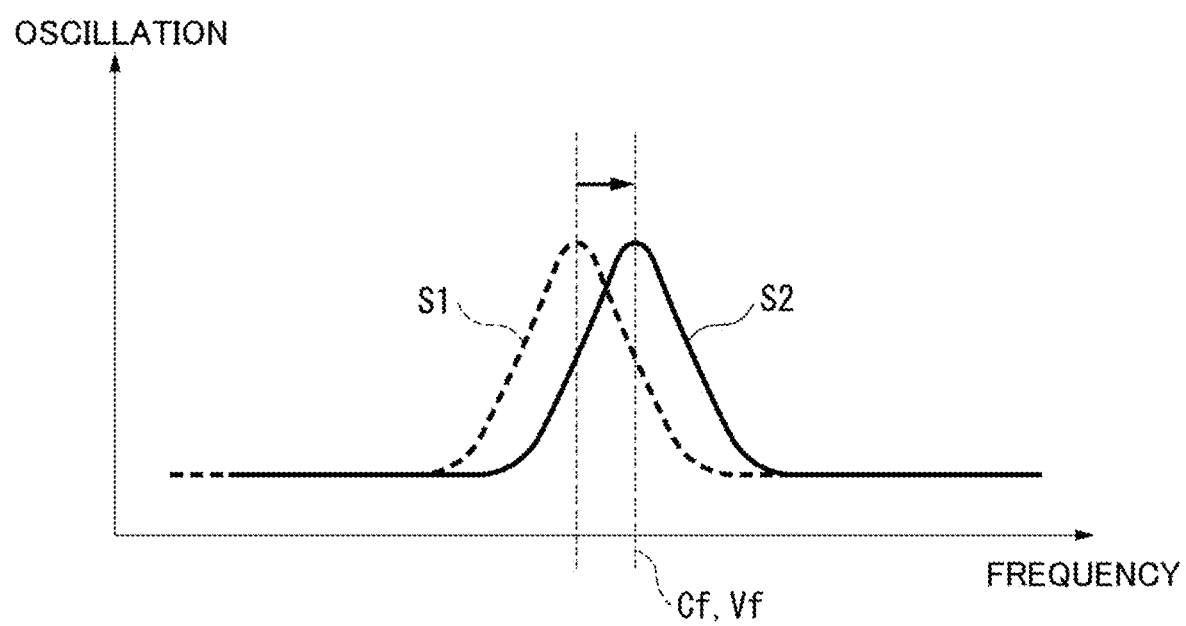
FIG. 7 is a graph showing a resonance lock function in the exemplary embodiment.

As shown in FIG. 7, upon detecting a deviation between the detected oscillation conditions Vf of the lens system 3 and the drive signal Cf inputted from the drive controller 61 to the lens system 3, the resonance-lock controller 611 searches for and captures the current peak position of the lens system 3, and changes the frequency of the drive signal Cf outputted from the drive controller 61 to the peak position of the drive current Ri.

Consequently, the frequency of the drive signal Cf inputted from the drive controller 61 to the lens system 3 is tuned to the peak of the resonance frequency of the current oscillation characteristics S2 of the lens system 3, thereby automatically tuning the frequency to the resonance frequency.

Referring back to FIG. 5, the controller PC 7 includes: a lens operation unit 71 configured to operate the lens controller 6 (e.g. configure the setting of the lens controller 6); an image processor 72 configured to import and process the detected image Im from the image detector 4; and an operation interface 73 configured to receive a user's operation on the variable focal length lens device 1.

The lens operation unit 71 is configured to make the setting of the lens controller 6 including the frequency, the amplitude and the maximum drive voltage of the drive signal Cf outputted from the drive controller 61. The lens operation unit 71 is also configured to adjust an illumination timing based on the illumination signal Ci outputted from the illumination controller 62.

The illumination timing based on the illumination signal Ci is set based on a phase and amplitude related to the drive signal Cf. The pulsed illumination applied on the target object 9 at a specific time point (phase and amplitude) on the focus-position-variation waveform Mf shown in FIG. 4 provides the image at the focus position Pf of the focal length Df at the illumination timing. In other words, the lens operation unit 71 is configured to control the illumination signal Ci to be synchronized with the drive signal Cf to obtain an image at the desired focal length Df. The above illumination timing may be set at a plurality of phases in one cycle of the drive signal Cf to designate a plurality of images with different focal lengths Df.

The lens operation unit 71 further includes a resonance-lock operation unit 711.

The resonance-lock operation unit 711 is configured to switch the state (i.e. enable/disable) of the resonance-lock controller 611 of the drive controller 61.

Specifically, the resonance-lock operation unit 711 is configured to: refer to the timing for the image processor 72 to import the detected image Im from the image detector 4; suspend the lock operation of the resonance-lock controller 611 in synchronization with the start of the image capturing; and resume the lock operation of the resonance-lock controller 611 in synchronization with the end of the image import (lock-suspension mode). In contrast, the resonance-lock operation unit 711 is also configured to select a mode in which the lock operation continues during the image import (lock-continuation mode).

Figure 8:
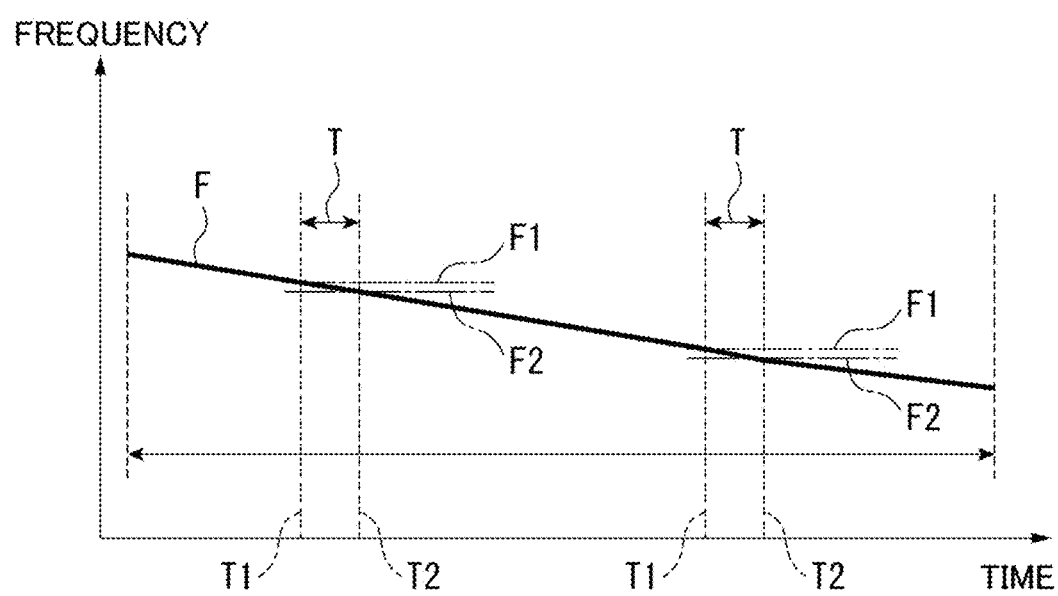
FIG. 8 is a graph showing an image detection during a resonance lock operation in the exemplary embodiment.

FIG. 8 shows a resonance frequency F, which is gradually decreased due to, for instance, change in the temperature inside the lens system 3.

It is supposed that the operation of the image processor 72 to import the detected image Im from the image detector 4 is conducted in a period T (start time: T1, end time: T2).

If the resonance-lock control is conducted by the resonance-lock controller 611, the resonance frequency F continues to change in the period T. Specifically, while the resonance frequency is F1 at the start time T1, the resonance frequency becomes F2 at the end time T2.

The resonance-lock control, which changes the frequency of the drive signal Cf applied to the drive controller 61 at every moment, destabilizes the standing wave in the lens system 3 to reduce the accuracy of the detected image Im. Accordingly, the resonance lock is suspended.

Figure 9:
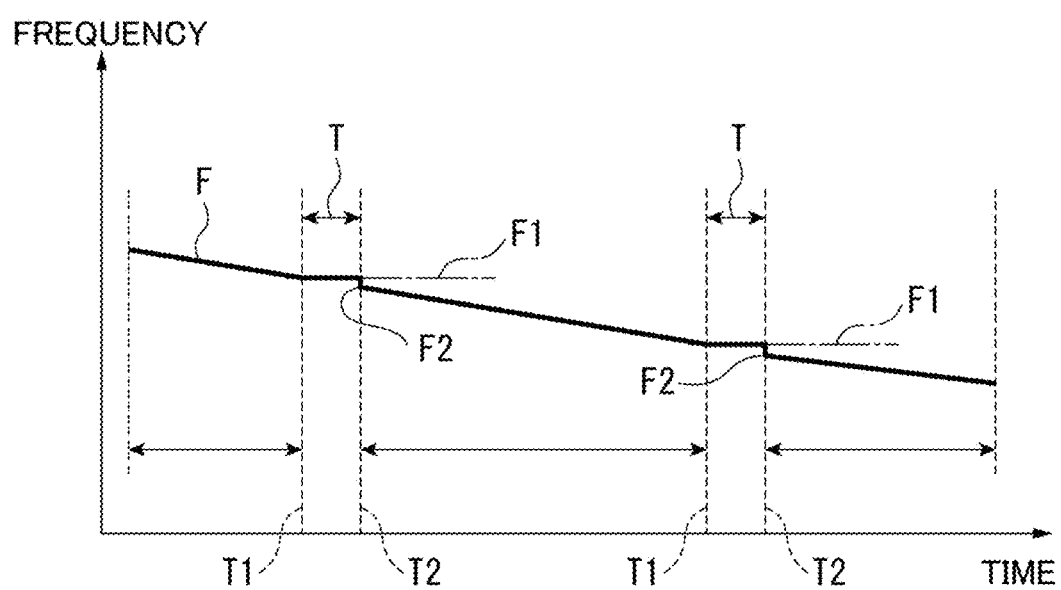
FIG. 9 is a graph showing an image detection during suspension of the resonance lock operation in the exemplary embodiment.

As shown in FIG. 9, the resonance-lock control by the resonance-lock controller 611 is suspended by the resonance-lock operation unit 711 in the period T for capturing the detected image Im in the exemplary embodiment.

The resonance-lock control by the resonance-lock controller 611 is suspended at the start time T1 in the period T, so that the resonance frequency F is maintained at the resonance frequency F1 of the start time T1. In this state, the detected image Im can be captured under a condition where the resonance frequency F is constant (i.e. with the constant focal length D1).

At the end time T2 of the period T, the resonance-lock operation unit 711 controls the resonance-lock controller 611 to conduct the resuming operation, thereby resuming the resonance-lock control.

The resonance-lock operation unit 711 can be selectably set in the lock-suspension mode and the lock-continuation mode. These modes can be switched by a user using the operation interface 73.

In the lock-suspension mode, the resonance-lock controller 611 is suspended in synchronization with the operation of the image processor 72 for capturing the detected image Im from the image detector 4.

In the lock-continuation mode, the resonance-lock controller is not suspended in synchronization with the operation of the image processor 72 for importing the detected image Im from the image detector 4.

Accordingly, the selection of the lock-suspension mode allows the resonance-lock controller 611 to be automatically suspended to avoid the change in the resonance frequency F and to capture an image of a high accuracy. In contrast, the selection of the lock-continuation mode is beneficial when it is not necessary to automatically suspend the resonance-lock controller 611.

Referring back to FIG. 5, the lens controller 6 in the exemplary embodiment is a dedicated hardware for controlling the operation of the lens system 3 and the pulsed light illuminator 5.

In contrast, the controller PC 7 is an existing personal computer, where a dedicated software is run to achieve a desired function.

Specifically, the function of the lens operation unit 71 for controlling the lens controller 6 can be achieved by running the lens operation software. In addition, the function of the image processor 72 for processing the detected image Im from the image detector 4 is achieved by running the image-processing software.

These lens operation software and the image-processing software can be operated by a user through the operation interface 73 in a form of a display screen of the controller PC 7 and/or an input device.

FIGS. 10 to 20 show screen interfaces of the lens operation software.

Figure 10:
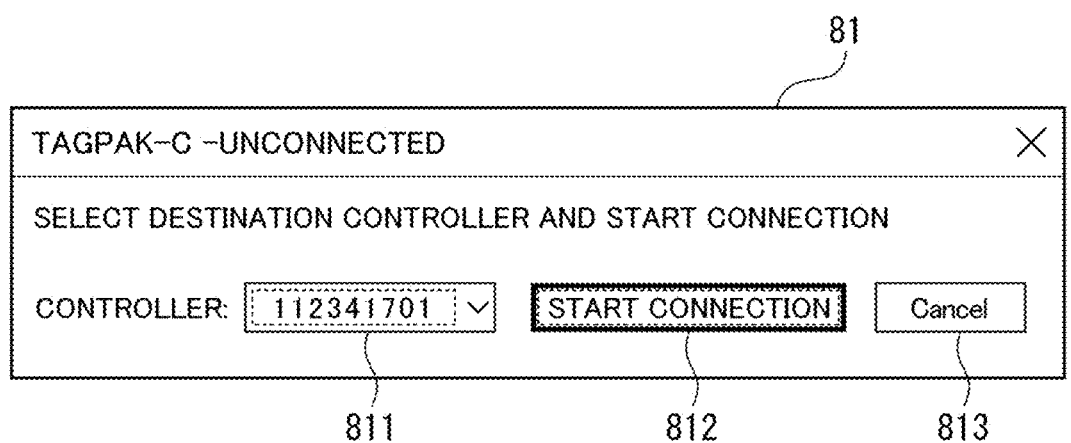
FIG. 10 illustrates a destination selection screen of a lens operation software in the exemplary embodiment.

When the lens operation software is run on the controller PC 7, the destination selection screen 81 shown in FIG. 10 appears.

Figure 12:
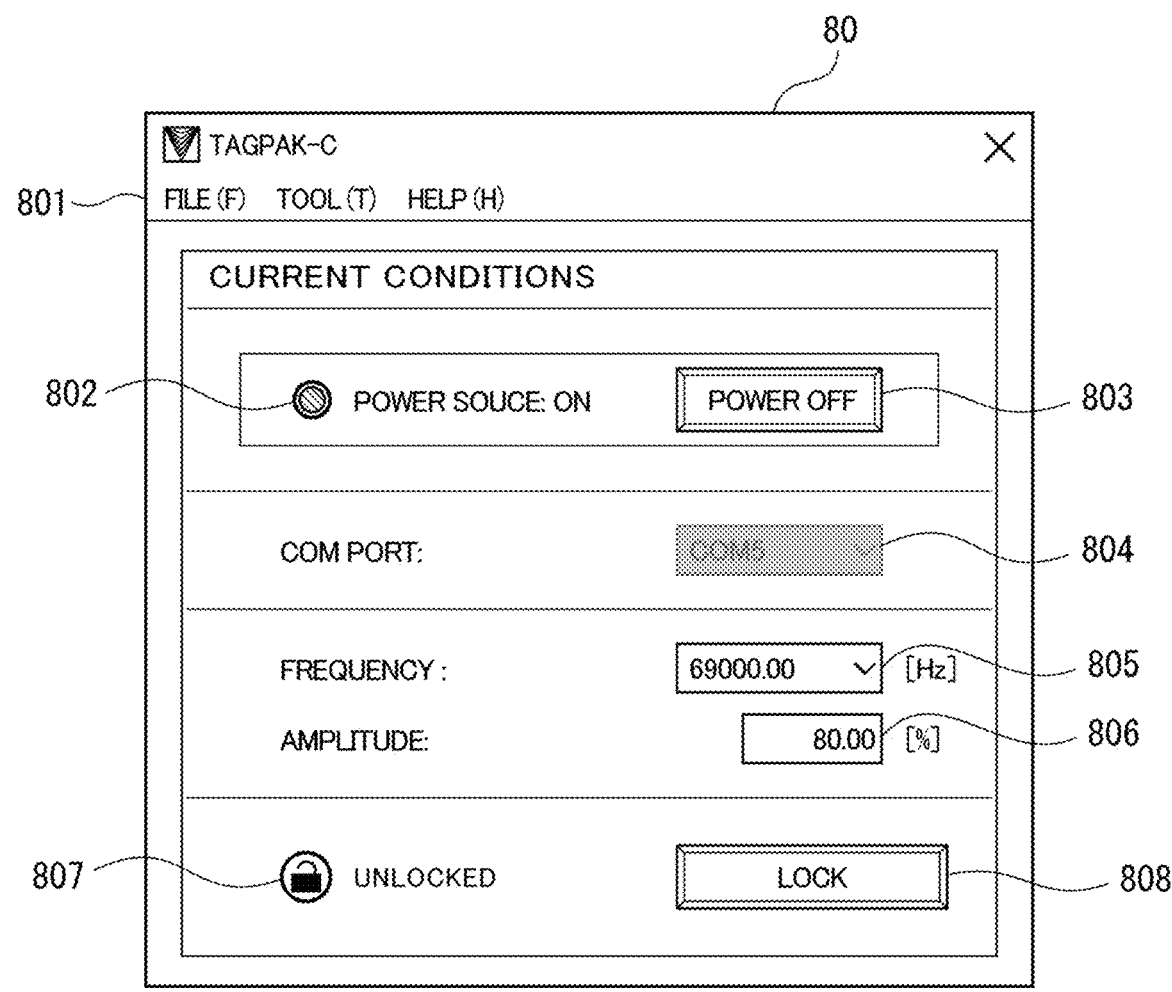
FIG. 12 illustrates a main screen of the lens operation software operating when the resonance lock is canceled in the exemplary embodiment.
Figure 13:
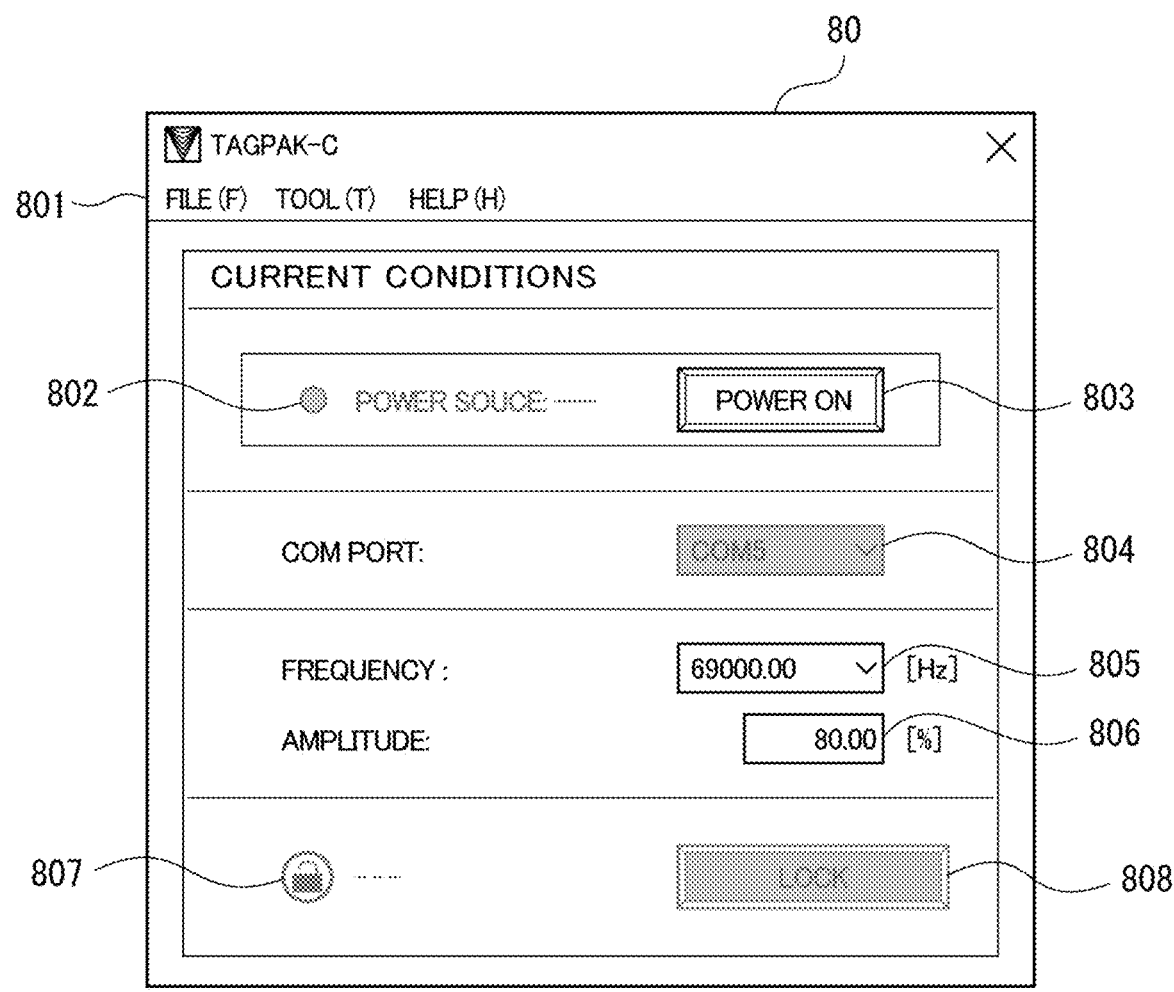
FIG. 13 illustrates the main screen of the lens operation software operating when a lens controller is powered off in the exemplary embodiment.
Figure 14:
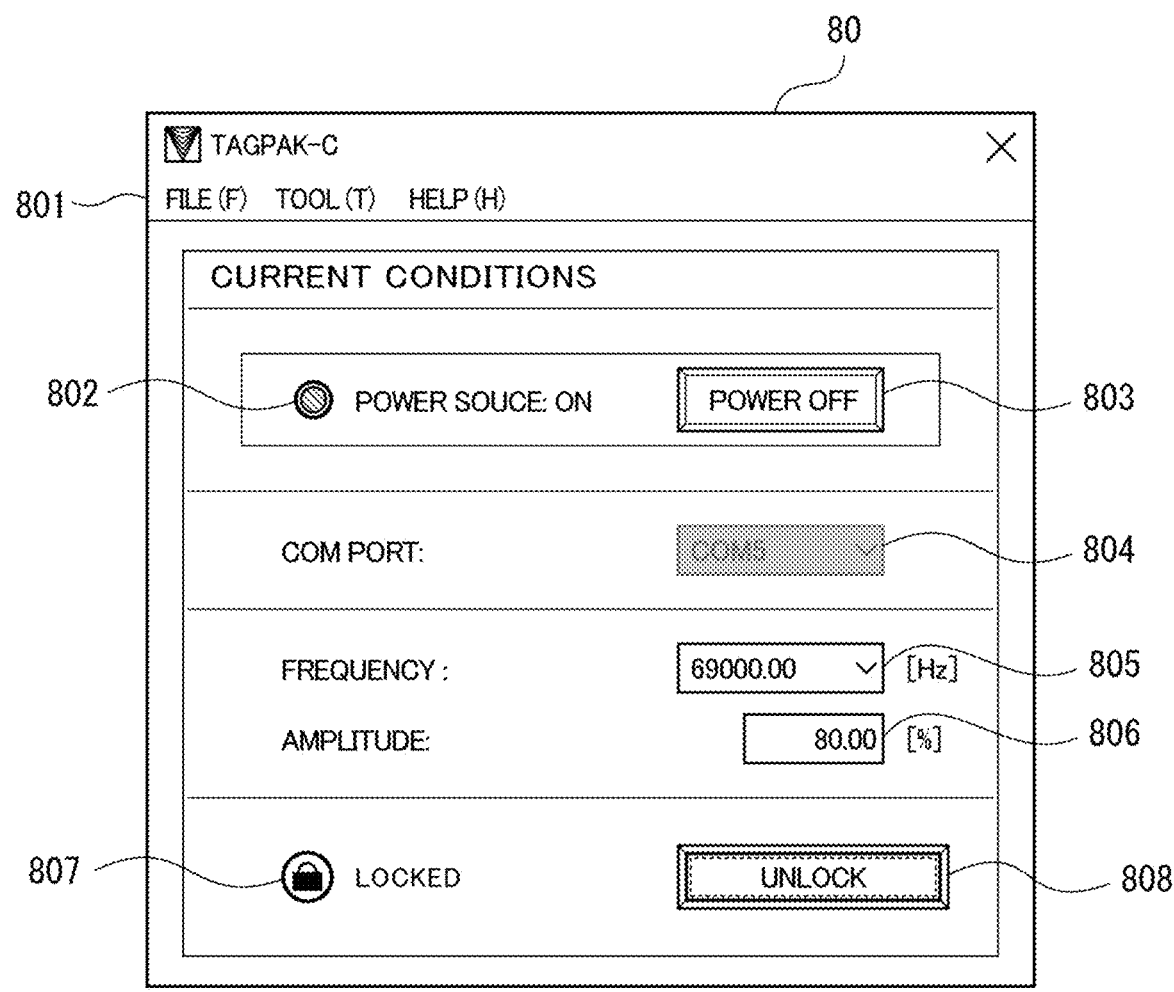
FIG. 14 illustrates the main screen of the lens operation software operating when the resonance lock is enabled in the exemplary embodiment.

The destination selection screen 81 is a sub screen independent of a main screen 80 (see FIG. 12).

The destination selection screen 81 appears not only when the lens operation software is activated but also when no lens controller 6 is in connection.

A destination designation field 811, a connection start button 812 and a cancel button 813 are provided on the destination selection screen 81.

The destination designation field 811 is used to designate the lens controller 6 to be operated by the activated lens operation software (lens operation unit 71) using a machine number (MID). A plurality of the lens controllers 6 are connectable to the controller PC 7. The lens system 3 and the pulsed light illuminator 5 are connected to each of the lens controllers 6.

The machine number may be directly typed in the destination designation field 811. The destination designation field 811 is in a form of a pull-down menu, from which the identification number of another lens controller 6 being designated may be selected.

When the connection start button 812 is pressed (i.e. conduct an execution operation), a connection between the designated lens controller 6 and the lens operation unit 71 is established and the process goes to the next step.

When the cancel button 813 is pressed, the current process is aborted and the destination selection screen 81 is closed.

Figure 11:
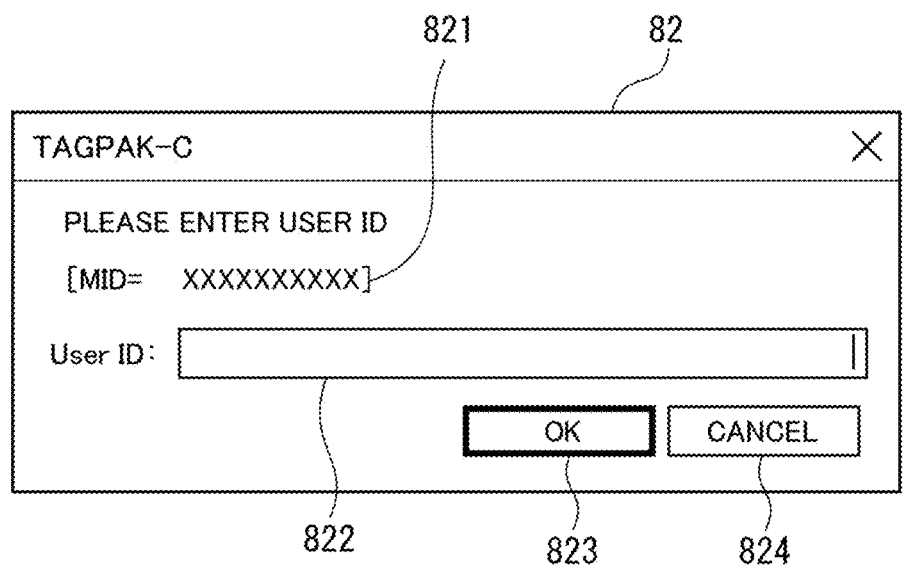
FIG. 11 illustrates an authentication screen of the lens operation software in the exemplary embodiment.

When the destination is designated using the destination selection screen 81, a user authentication screen 82 shown in FIG. 11 appears.

The user authentication screen 82 is a sub screen independent of the main screen 80 (see FIG. 12).

An MID display 821, a user ID entry field 822, an OK button 823 and a cancel button 824 are provided on the user authentication screen 82.

An ID number of the user using the lens operation software is entered in the user ID entry field 822.

When the OK button 823 is pressed, authentication of the ID number entered in the user ID entry field 822 is performed. When the entered ID number has no execution authority, entry of the ID number is again requested. When it is confirmed that the entered ID number has the execution authority, the process goes to the next step.

When the cancel button 824 is pressed, the current process is aborted and the user authentication screen 82 is closed.

When the user authentication using the user authentication screen 82 is completed, the main screen 80 shown in FIG. 12 appears.

The main screen 80 is provided with a menu bar 801 at an upper part of a window. The main screen 80 is also provided with a power indicator 802, a power operation button 803, a port designation field 804, a frequency designation field 805, an amplitude designation field 806, a lock indicator 807, and a lock operation button 808 in the window.

The power indicator 802 shows an on/off state of the power source of the lens controller 6 currently designated to be controlled. The on/off of the power source of the lens controller 6 currently designated to be controlled can be alternately switched by pressing the power operation button 803.

Characters displayed on the power operation button 803 change depending on the on/off state of the power source of the lens controller 6 currently designated to be controlled. For instance, when the power source is currently turned on, the power operation button 803 shows the text "POWER OFF" (see FIG. 12). When the power source is currently turned off, the power operation button 803 shows the text "POWER ON" (see FIG. 13). When the power source is currently turned off, the lock indicator 807 and the lock operation button 808 are displayed in gray and are disabled.

The port designation field 804 is displayed in gray (unselectable) when the destination (the lens controller 6 to be controlled) has been determined in the destination selection screen 81 shown in FIG. 10. When the destination has not been determined, the destination is selectable in the port designation field 804. The port designation field 804 displays a list of I/O port name(s) of the controller PC 7 connected with the lens controller 6 or ID(s) of the controller(s) connected with the controller PC 7. The port designation field 804, which is in a form of a pull-down menu, is configured to switch the currently displayed port to another port. The I/O port name or the controller ID may be directly typed in the port designation field 804.

A target value of the frequency of the drive signal Cf currently set in the lens controller 6 is displayed in the frequency designation field 805. The frequency designation field 805, which is in a form of a pull-down menu, is configured to switch the currently displayed value to another value. The value may be directly typed in the frequency designation field 805.

A target value of the amplitude of the drive signal Cf currently set in the lens controller 6 is displayed in the amplitude designation field 806. The amplitude of the drive signal Cf herein refers to a ratio of the voltage actually used as the drive signal Cf to a later-described maximum drive voltage (see FIG. 14). The amplitude designation field 806, which is in a form of a pull-down menu, is configured to switch the currently displayed value to another value. The value may be directly typed in the amplitude designation field 806.

The lock indicator 807 shows an on/off state of the resonance-lock function in the lens controller 6 that is currently designated to be controlled. The on/off of the resonance-lock function in the lens controller 6 currently designated to be controlled can be alternately switched by pressing the lock operation button 808.

Characters displayed on the lock operation button 808 change depending on the on/off state of the resonance-lock function of the lens controller 6 currently designated to be controlled. For instance, when the resonance-lock function is disabled (lock being cancelled), the lock operation button 808 shows the text "ENABLE LOCK" (see FIG. 12). When the resonance-lock function is enabled, the lock operation button 808 shows the text "CANCEL LOCK" (see FIG. 14).

The menu bar 801 on the main screen 80 allows selection and execution of other functions.

Figure 15:
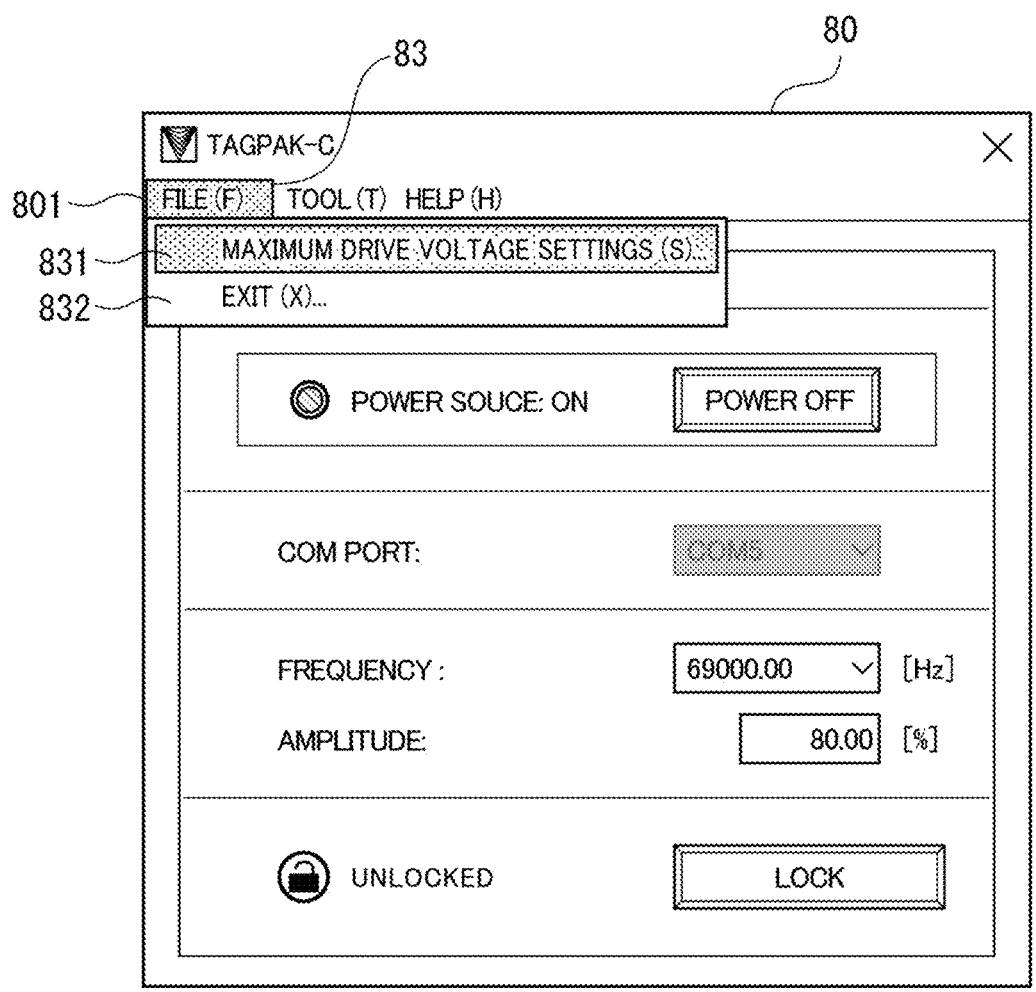
FIG. 15 illustrates an operation performed in order to display a sub screen of the lens operation software for setting a maximum drive voltage in the exemplary embodiment.

When the file menu 83 in the menu bar 801 is pulled down in FIG. 15, a maximum drive voltage setting menu 831 and an exit menu 832 appear.

Figure 16:
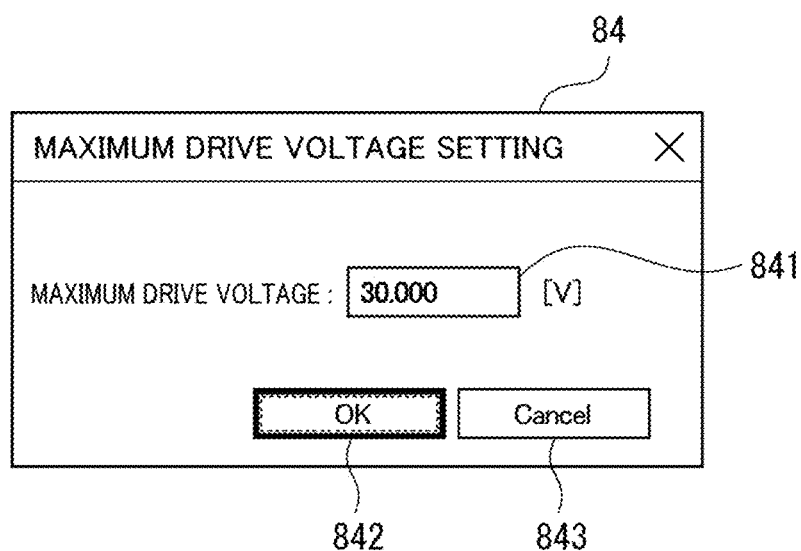
FIG. 16 illustrates the sub screen of the lens operation software for setting the maximum drive voltage in the exemplary embodiment.

When the maximum drive voltage setting menu 831 is selected, the maximum drive voltage setting screen 84 shown in FIG. 16 appears.

The maximum drive voltage setting screen 84 shown in FIG. 16, which is a sub screen independent of the main screen 80, can be overlaid on the main screen 80.

A maximum drive voltage designation field 841, an OK button 842 and a cancel button 843 are provided on the maximum drive voltage setting screen 84.

The maximum voltage (i.e. the voltage at the maximum amplitude) of the drive signal Cf outputted by the lens controller 6 is designated in the maximum drive voltage designation field 841.

The maximum voltage may be directly typed in the maximum drive voltage designation field 841. The maximum drive voltage designation field 841 is in a form of a pull-down menu. Accordingly, the value of the maximum voltage may be designated by a selection of another value displayed in the destination designation field 811.

When the OK button 842 is pressed, the maximum voltage entered in the maximum drive voltage designation field 841 is set in the lens controller 6.

When the cancel button 843 is pressed, the current process is aborted and the maximum drive voltage setting screen 84 is closed.

Figure 17:
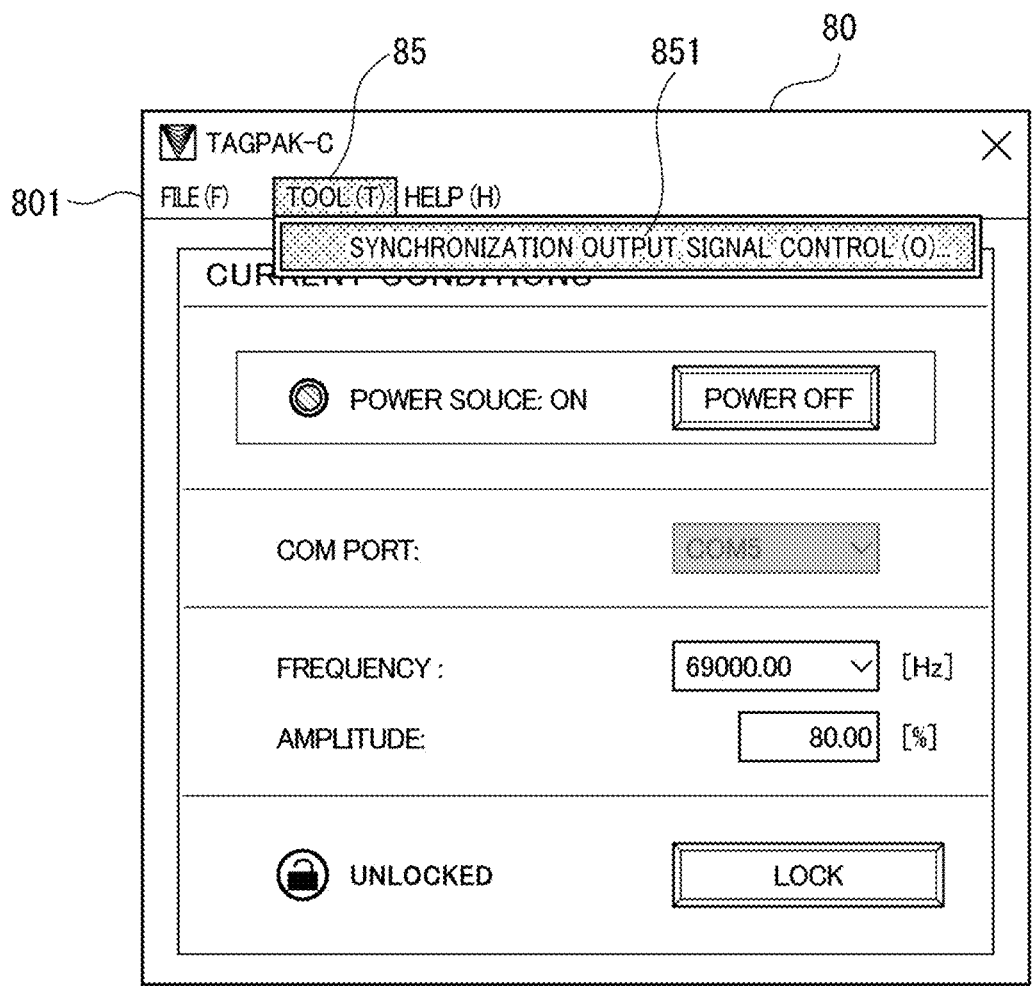
FIG. 17 illustrates an operation performed in order to display a sub screen of the lens operation software for controlling a synchronization output signal in the exemplary embodiment.

When the tool menu 85 in the menu bar 801 is pulled down in FIG. 17, a synchronization output signal control menu 851 appears.

Figure 18:
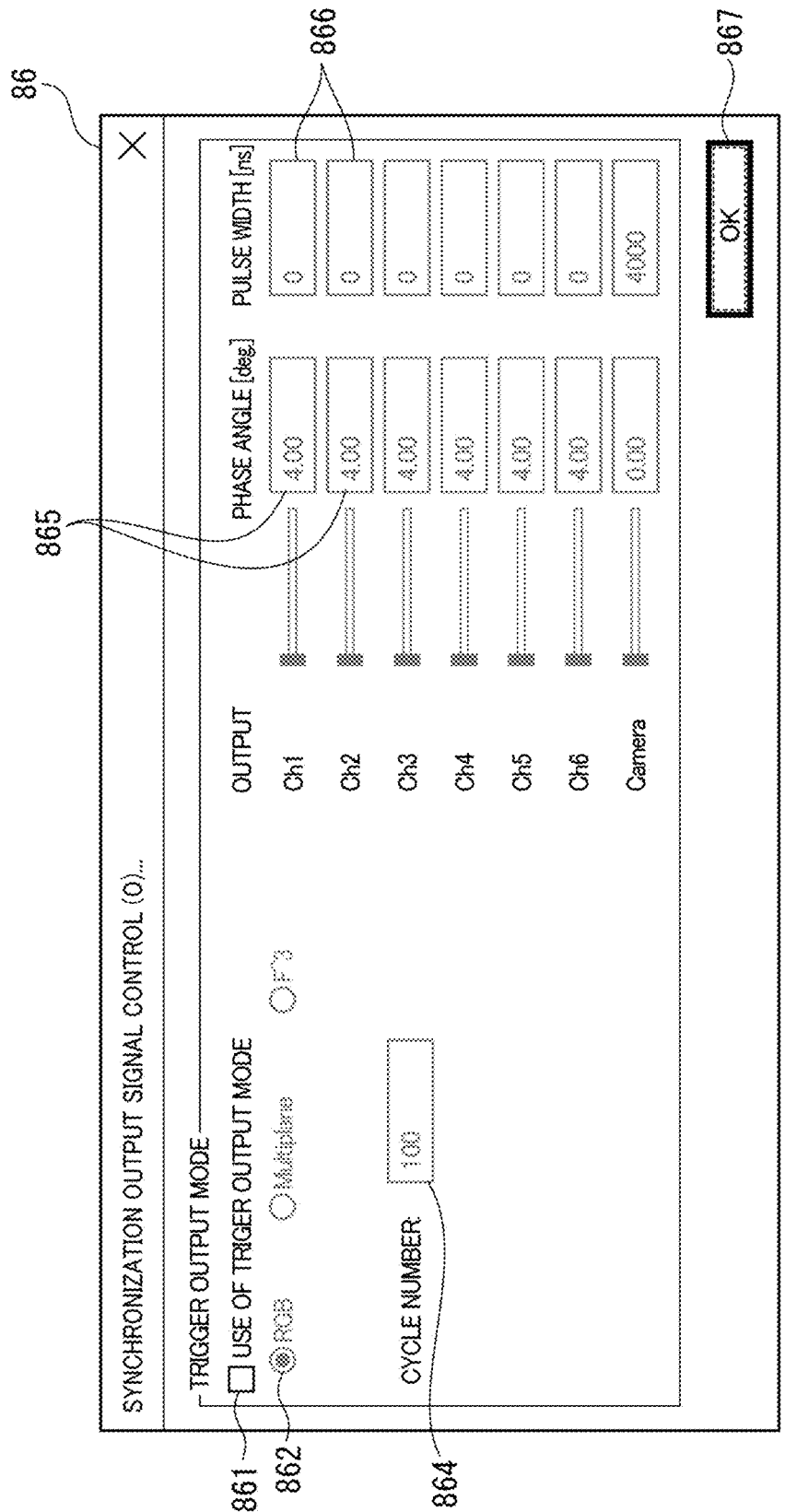
FIG. 18 illustrates the sub screen of the lens operation software for controlling the synchronization output signal in the exemplary embodiment.
Figure 19:
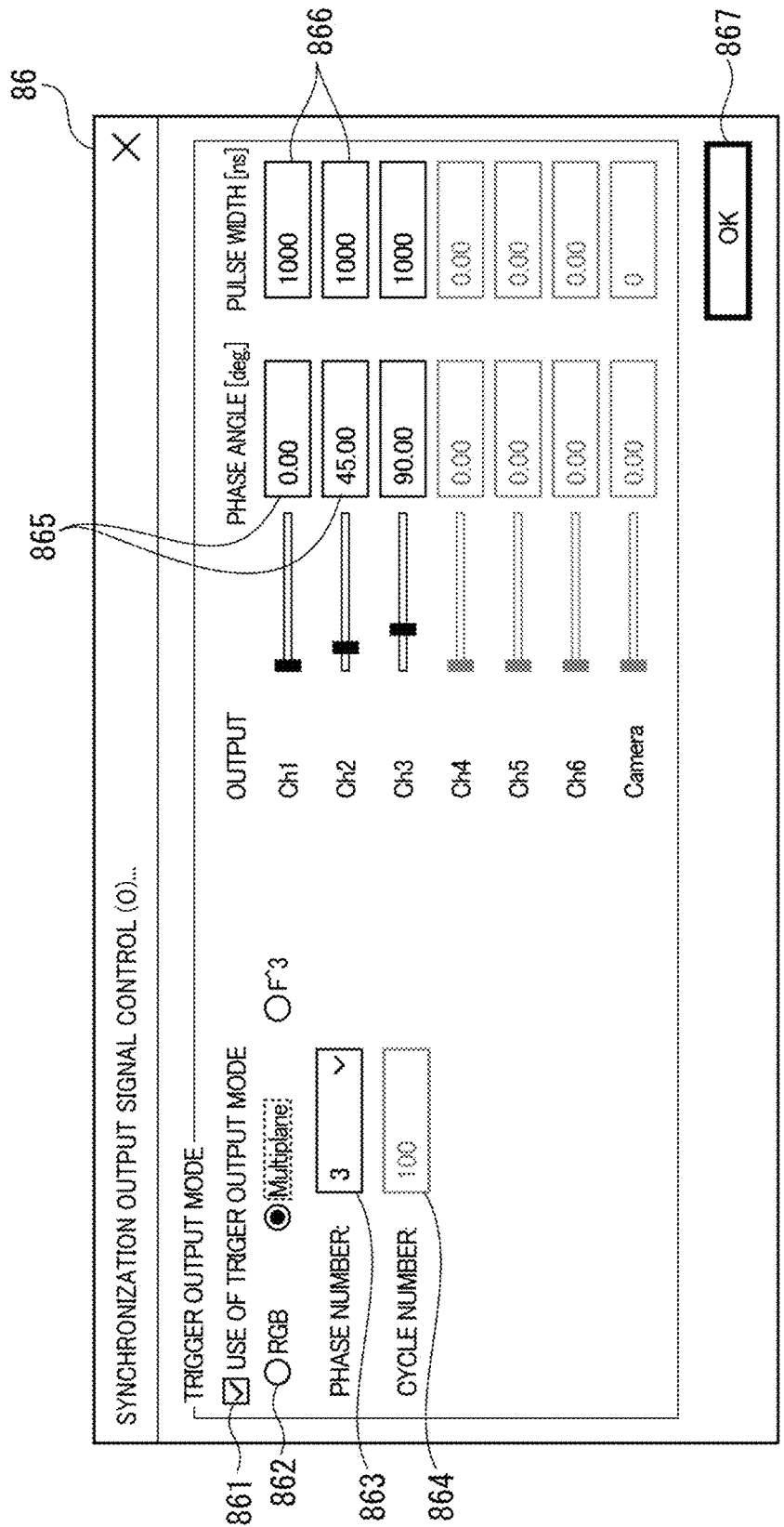
FIG. 19 illustrates setting of items on the sub screen of the lens operation software for controlling the synchronization output signal in the exemplary embodiment.

When the synchronization output signal control menu 851 is selected, a synchronization output signal control screen 86 shown in FIGS. 18 and 19 appears.

The synchronization output signal control screen 86, which is a sub screen independent of the main screen 80, can be overlaid on the main screen 80.

A trigger-output-mode-use check box 861, a mode-selection radio button 862, phase-number designation field 863 (only when a multi-plane mode is selected) and a cycle-number designation field 864 are provided on a left side of the synchronization output signal control screen 86. Total seven sets (corresponding to channels 1 to 6 of an external trigger output terminal provided to the lens controller 6, and the camera (the image detector 4)) of phase-angle designation fields 865 and pulse-width designation fields 866 are provided on a right side of the synchronization output signal control screen 86. An OK button 867 is provided to a lower right end of the synchronization output signal control screen 86.

By checking the trigger-output-mode-use check box 861, the illumination timing based on the illumination signal Ci in the illumination controller 62 of the lens controller 6 becomes adjustable.

The mode-selection radio button 862, which is enabled when the trigger-output-mode-use check box 861 is checked, allows selection of any one of RGB mode, the multi-plane mode, and F^3 mode when being enabled.

In the RGB mode, the illumination timing based on the illumination signal Ci is controlled using the channels 1 to 3 of the external trigger output terminal provided to the lens controller 6.

In the multi-plane mode, any one of the channels (e.g. the channel 1) of the external trigger output terminal provided to the lens controller 6 is used to assign the illumination timing of a plurality of the illumination signals Ci to one cycle of the drive signal Cf, thereby obtaining images at a plurality of focal lengths.

In the F^3 mode, an image-detection timing based on the image-detection signal Cc and the illumination timing based on the illumination signal Ci are controlled at a constant interval corresponding to a frame of the image based on trigger signals from the external trigger output terminal provided to the lens controller 6 and a camera trigger output terminal provided to the image-detection controller 63.

The frequency of the outputting timing of the illumination signal in one cycle of the focus-position-variation waveform Mf (see FIG. 4) of the focal length Df is set using the phase-number designation field 863. Numerical values can be directly typed in the phase-number designation field 863. For instance, when the output timing in one cycle is set at three phases (i.e. 45 degrees, 90 degrees and 135 degrees), the frequency of the output timing is three. The phase-number designation field 863 is in a form of a pull-down menu. Accordingly, the frequency of the output timing may be designated by a selection of another value displayed in the phase-number designation field 863.

The cycle number in F^3 mode is set in the cycle-number designation field 864. A numerical value can be directly typed in the cycle-number designation field 864. The cycle-number designation field 864 is in a form of a pull-down menu. Accordingly, the cycle number may be designated by a selection of another value displayed in the cycle-number designation field 864.

The channels 1 to 6 of the external trigger output terminal provided to the lens controller 6 and the camera trigger output terminal provided to the image-detection controller 63 are each assigned to the corresponding one of the phase-angle designation fields 865. The phase angle of the drive signal Cf with respect to the focus-position-variation waveform Mf (see FIG. 4) of the focal length Df is designated in each of the phase-angle designation fields 865.

The channels 1 to 6 of the external trigger output terminal provided to the lens controller 6 and the camera trigger output terminal provided to the image-detection controller 63 are each assigned to the corresponding one of the pulse-width designation fields 866. The pulse width of the illumination signal Ci for each of the phases of the drive signal Cf designated in the phase-angle designation fields 865 is designated in the corresponding one of the pulse-width designation fields 866.

In FIG. 19, the trigger-output-mode-use check box 861 is checked to enable the trigger output mode. The multi-plane mode is selected by the mode-selection radio button 862. The phase number "3" is designated in the phase-number designation field 863. The phase-angle designation fields 865 and the pulse-width designation fields 866 for the channels 1 to 3 of the external trigger output terminal are enabled for entry of values on the right side of the window.

When the OK button 867 is pressed, the setting related to the synchronization output signal is completed and the synchronization output signal control screen 86 is closed.

Figure 20:
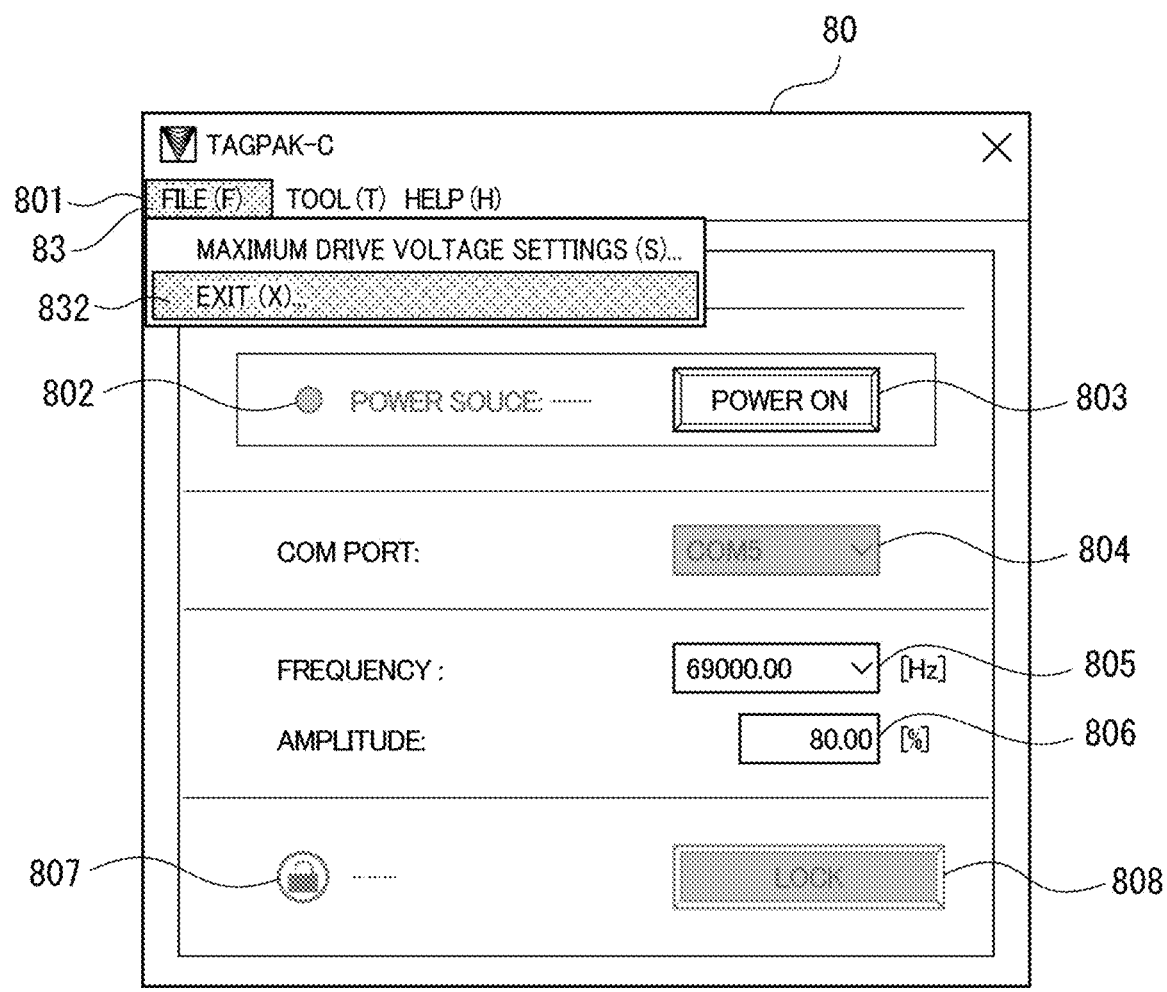
FIG. 20 illustrates an exit operation of the lens operation software in the exemplary embodiment.

As shown in FIG. 20, the file menu 83 of the menu bar 801 includes the exit menu 832. The lens operation software is ended when the exit menu 832 is selected.

When the setting of the control process of the lens controller 6 is done by the lens operation software, the image-processing software is run to achieve the function of the image processor 72 for processing the detected image Im from the image detector 4.

FIGS. 21 to 25 show screen interfaces of the image-processing software.

Figure 21:
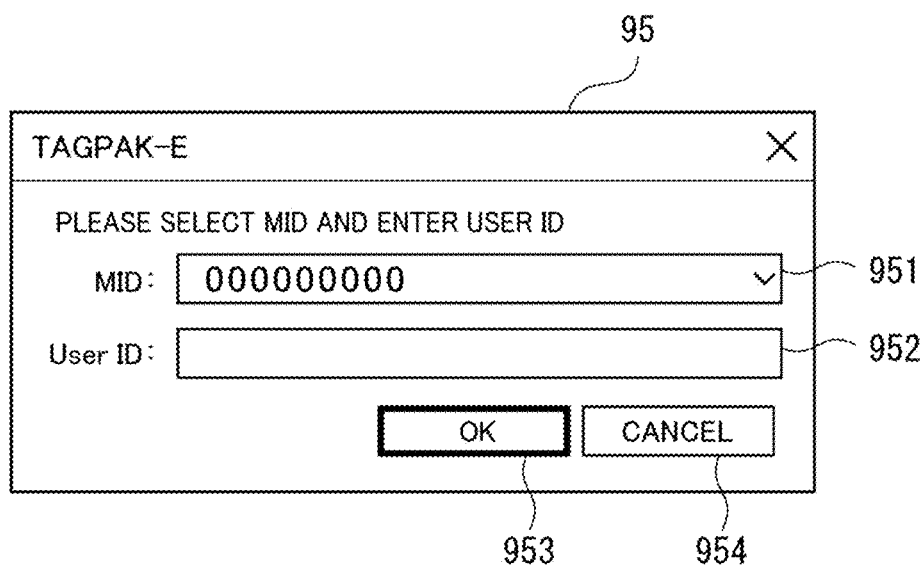
FIG. 21 illustrates an authentication screen of an image-processing software in the exemplary embodiment.

When the image-processing software is run on the controller PC 7, the user authentication screen 95 shown in FIG. 21 appears.

Figure 22:
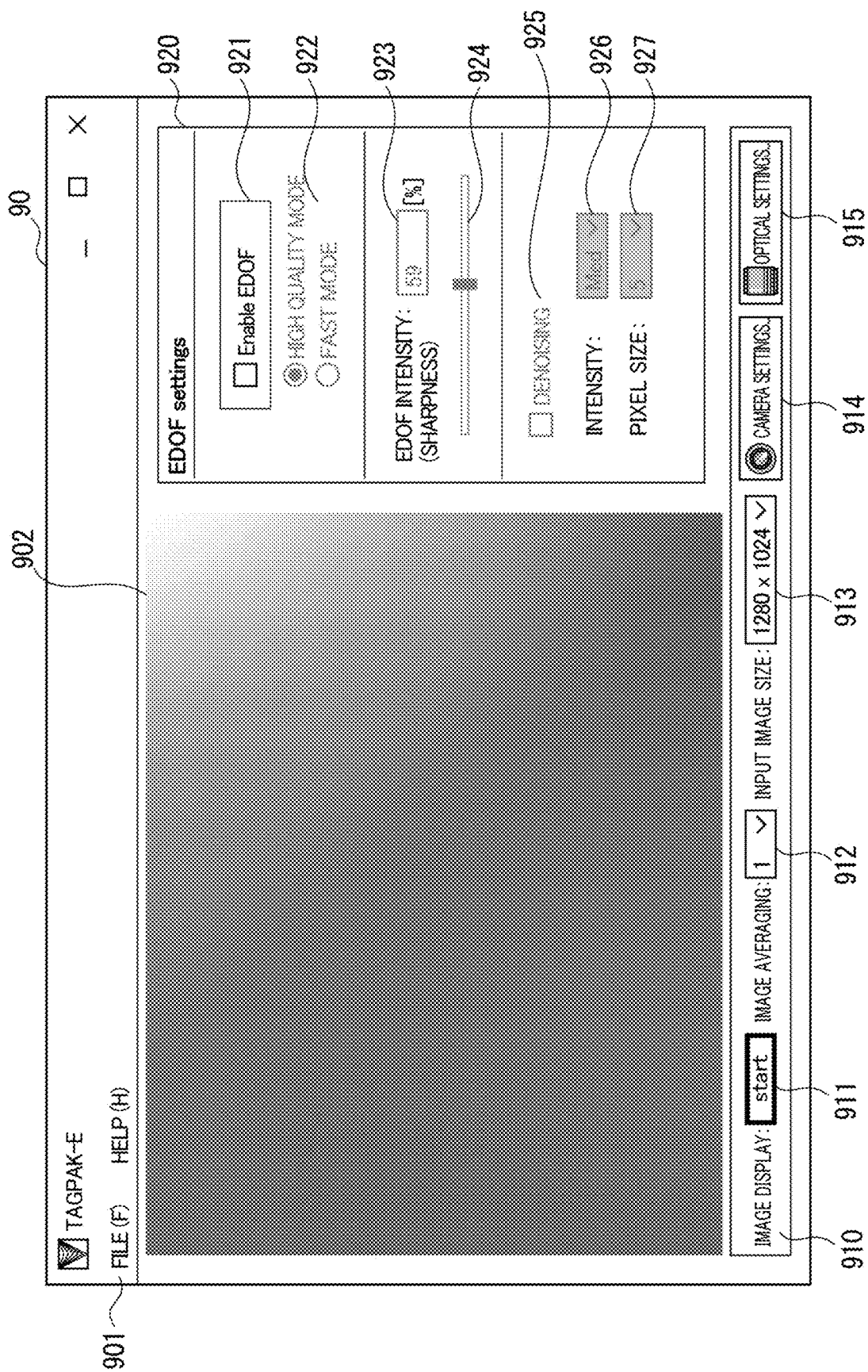
FIG. 22 illustrates a main screen of the image-processing software in the exemplary embodiment.
Figure 23:
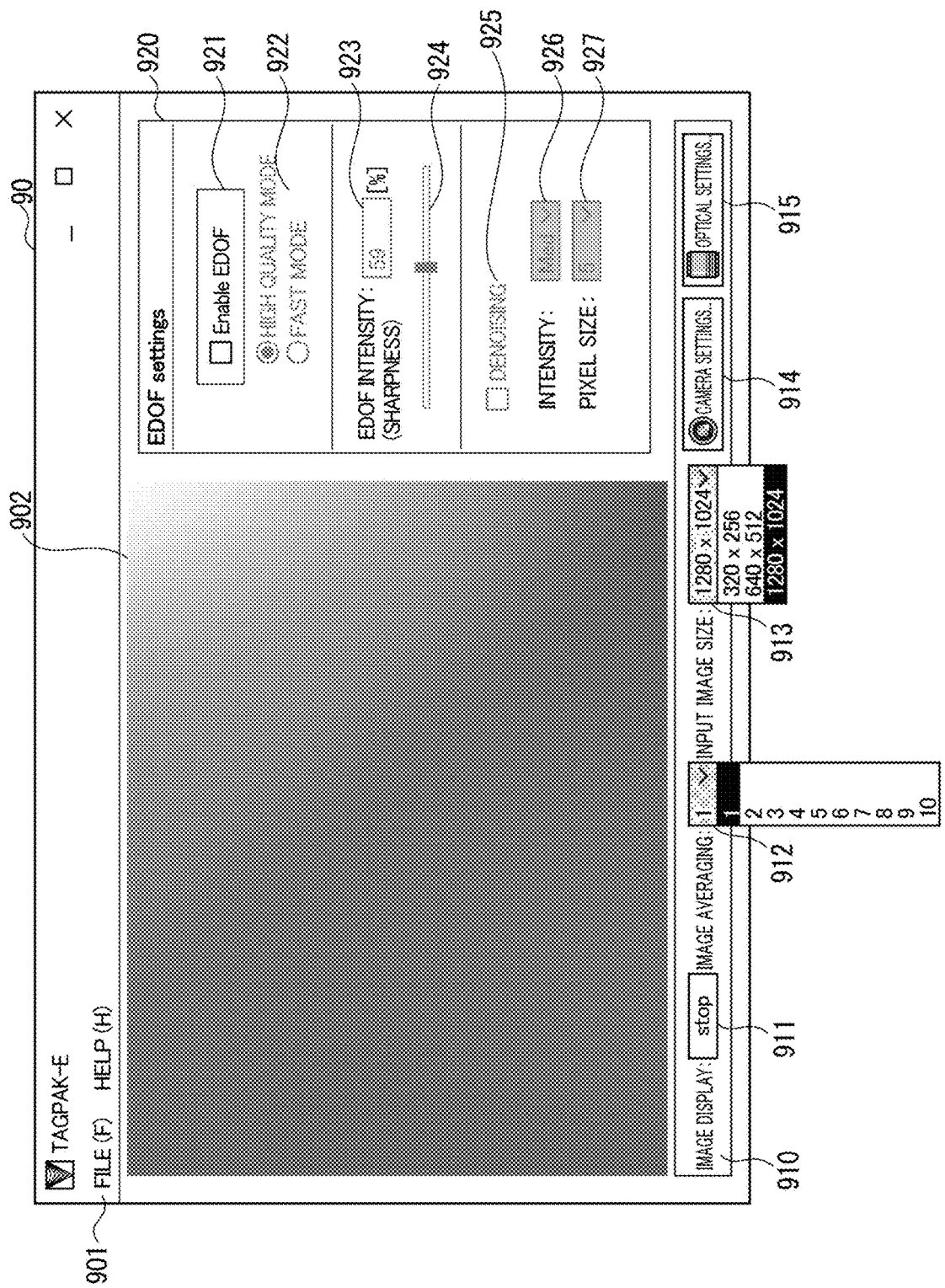
FIG. 23 illustrates an image setting operation on the main screen of the image-processing software in the exemplary embodiment.

The user authentication screen 95 is a sub screen independent of the main screen 90 (see FIG. 22).

A MID entry field 951, a user ID entry field 952, an OK button 953 and a cancel button 954 are provided on the user authentication screen 95.

The machine number (MID) of the lens controller 6 for forming the detected image Im to be processed by the image-processing software is entered in the MID entry field 951. The machine number may be directly typed in the MID entry field 951. The MID entry field 951 is in a form of a pull-down menu. Accordingly, the machine number may be designated by a selection of another value displayed in the MID entry field 951.

An ID number of the user using the image-processing software is entered in the user D entry field 952.

When the OK button 953 is pressed, authentication of the ID number entered in the user ID entry field 952 is performed. When the inputted ID number has no execution authority, entry of the ID number is again requested. When it is confirmed that the entered ID number has the execution authority, the process goes to the next step.

When the cancel button 954 is pressed, the current process is aborted and the user authentication screen 95 is closed.

When the user authentication by the user authentication screen 95 is completed, the main screen 90 shown in FIG. 22 appears.

A menu bar 901 is provided on an upper part of the window of the main screen 90. An image display 902 is provided near upper left end in the window. An image operation section 910 is provided along a lower edge of the image display 902. An EDOF setting section 920 is provided on the right side of the image display 902.

The image operation section 910 is provided with an image display button 911, an image averaging field 912, an input image size field 913, a camera setting button 914, and an optical setting button 915.

When the image display button 911 is pressed while the text "Start" is shown on the image display button 911, the detected image Im imported to the image processor 72 by the image detector 4 selected by a later-described camera selection field 932 is displayed on the image display 902 in real time. While the image is displayed in real time, the text "Stop" is shown on the image display button 911. When the image display button 911 is pressed in this state, the real-time display is stopped.

Luminance values of pixels in the number of image frame(s) entered in the image averaging field 912 are averaged to generate an image shown by pixels of the averaged luminance values, thereby reducing noises on the image.

Numerical value may be directly typed in the image averaging field 912. The image averaging field 912 is in a form of a pull-down menu. Accordingly, the numerical value may be designated by a selection of another value displayed in the image averaging field 912.

A size of the detected image Im shown in the image display 902 is selected using the input image size field 913. Basically, the size of the detected image Im, which is dependent on the image detector 4, is represented by the number of horizontal and vertical pixels of the image available for the image detector 4. The input image size field 913 is in a form of a pull-down menu. Accordingly, image sizes displayed in the input image size field 913 are selectable (see FIG. 23).

Figure 24:
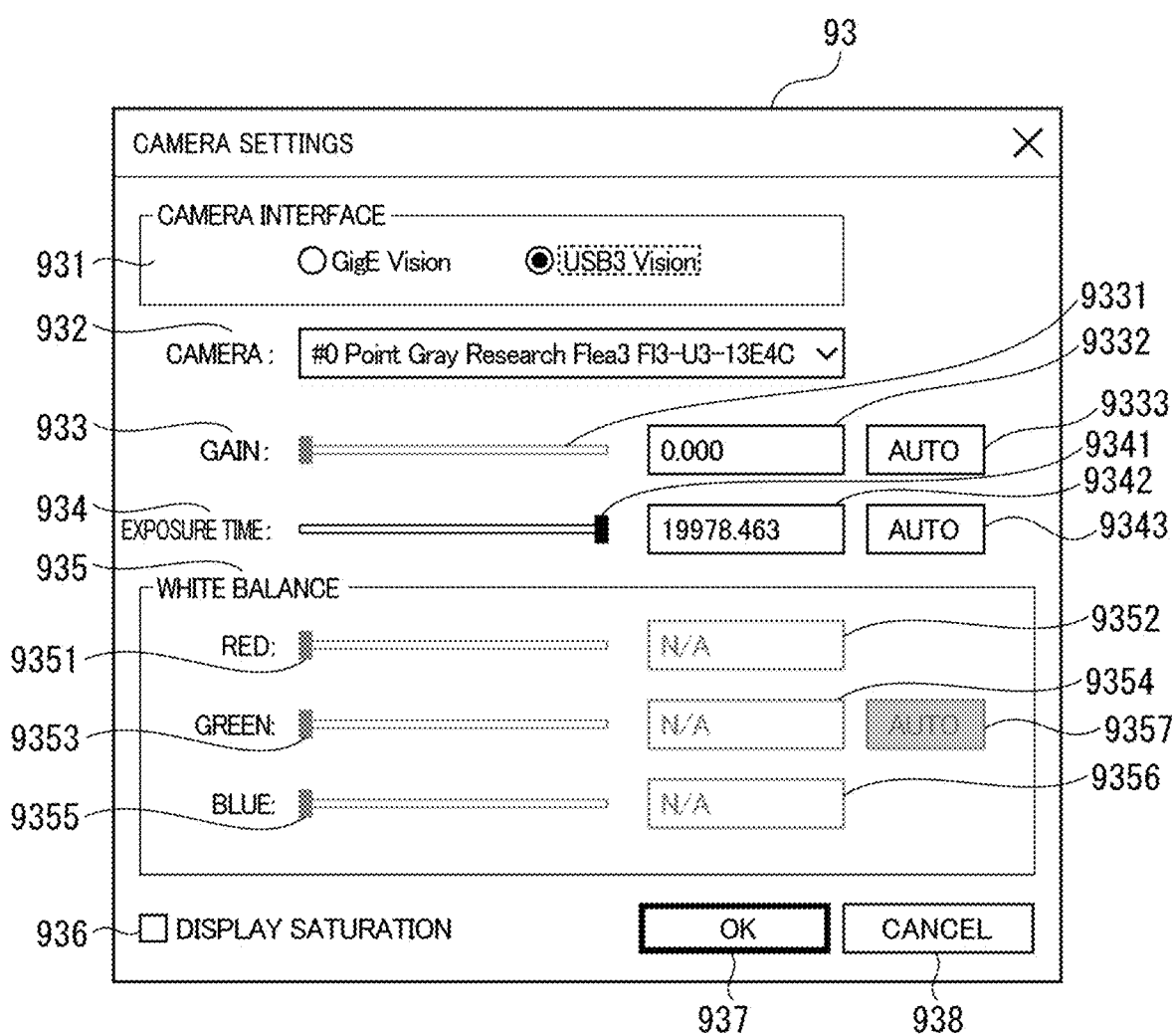
FIG. 24 illustrates a camera-setting sub screen of the image-processing software in the exemplary embodiment.

When the camera setting button 914 is pressed, a camera setting screen 93 shown in FIG. 24 appears.

Figure 25:
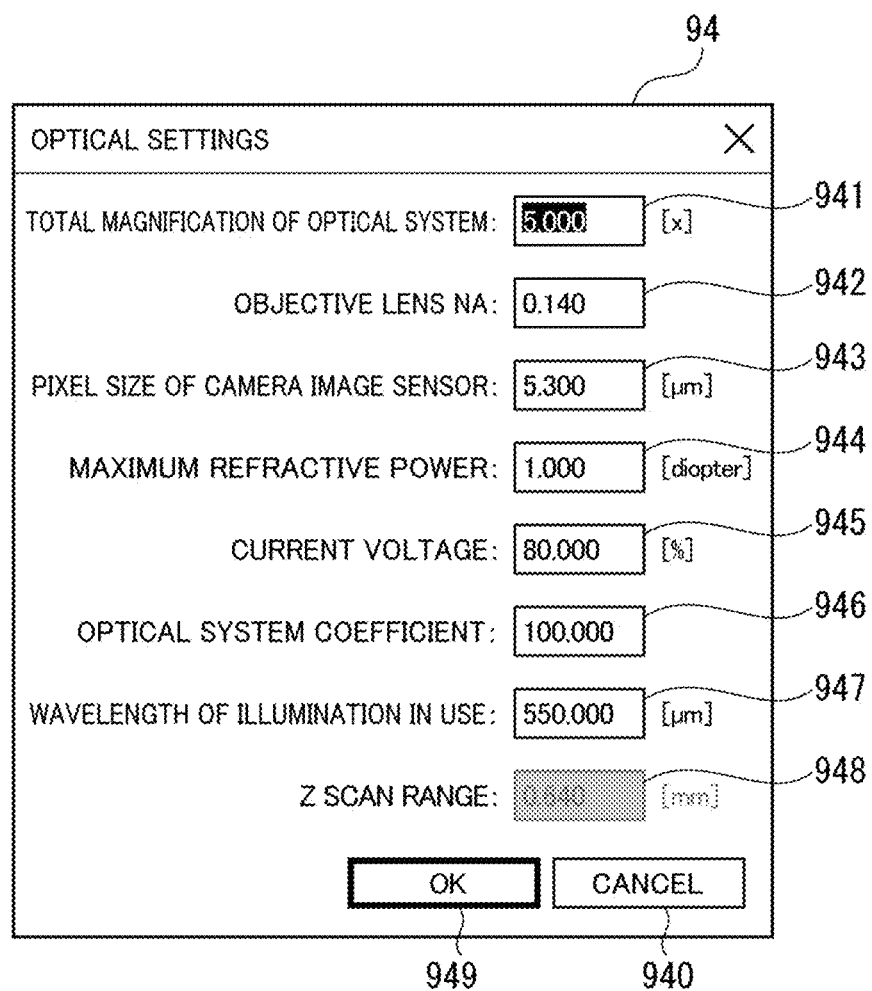

When the optical setting button 915 is pressed, an optical setting screen 94 shown in FIG. 25 appears.

The camera setting screen 93 shown in FIG. 24, which is a sub screen independent of the main screen 90, can be overlaid on the main screen 90.

The camera setting screen 93 is provided with a camera-interface-selection radio button 931, a camera selection field 932, a gain entry field 933, an exposure-time entry field 934, a white-balance adjustment field 935, a saturation-indicating check box 936, an OK button 937, and a cancel button 938.

The type of the interface of the image detector 4 is selected using the camera-interface-selection radio button 931.

The type of the camera used as the image detector 4 is designated in the camera selection field 932. The camera type may be directly typed in the camera selection field 932. The camera selection field 932 is in a form of a pull-down menu. Accordingly, the camera type may be designated by a selection of another camera type displayed in the camera selection field 932.

A gain (sensitivity) of the image detector 4 in capturing the detected image Im is designated in the gain entry field 933. The gain entry field 933 is provided with a slider 9331, a value entry field 9332, and an automatic adjustment button 9333.

The current gain is shown in the value entry field 9332. The value of the gain may be directly typed in the value entry field 9332. The gain may alternatively be set by operating the slider 9331. Further, the gain can be automatically adjusted by pressing the automatic adjustment button 9333. The value of the thus determined gain is displayed in the value entry field 9332.

An exposure time of the image detector 4 in capturing the detected image Im is designated in the exposure-time entry field 934. The exposure-time entry field 934 is provided with a slider 9341, a value entry field 9342, and an automatic adjustment button 9343.

The current exposure time is shown in the value entry field 9342. The value of the exposure time may be directly entered in the value entry field 9342. The exposure time may alternatively be set by operating the slider 9341. Further, the exposure time can be automatically adjusted by pressing the automatic adjustment button 9343. The value of the thus determined exposure time is displayed in the value entry field 9342.

A white balance in capturing the detected image Im by the image detector 4 is designated in the white-balance adjustment field 935. The white-balance adjustment field 935 is provided with: a slider 9351 and value entry field 9352 for designating a red-color ratio; a slider 9353 and value entry field 9354 for designating a green-color ratio; a slider 9355 and value entry field 9356 for designating a blue-color ratio; and an automatic adjustment button 9357.

The red-color ratio can be designated by operating the slider 9351 or entering values in the value entry field 9352. The designated red-color ratio is displayed in the value entry field 9352.

Similarly, the green-color ratio and the blue-color ratio can be designated by operating the sliders 9353, 9355 or entering values in the value entry fields 9354, 9356. The designated green-color ratio and the blue-color ratio are displayed in the value entry field 9354 and the value entry field 9356, respectively.

When the automatic adjustment button 9357 is pressed, the red-color ratio, green-color ratio and blue-color ratio are automatically adjusted and are displayed in the value entry fields 9352, 9354 and 9356 respectively.

When the saturation-indicating check box 936 is checked, the pixels) whose illuminance value is saturated is displayed in blue.

When the OK button 937 is pressed, the setting is stored and the camera setting screen 93 is closed.

When the cancel button 938 is pressed, the current process is aborted and the camera setting screen 93 is closed.

The optical setting screen 94 shown in FIG. 25, which is a sub screen independent of the main screen 90, can be overlaid on the main screen 90.

The optical setting screen 94 is provided with a field for a total magnification 941 of the optical system, a field for an NA 942 of the objective lens, a field for a pixel size 943 of the camera image sensor, a field for maximum refractive power 944, a field for a current voltage 945, a field for an optical system coefficient 946, a field for a wavelength 947 of illumination in use, a field for a Z-scan range 948, an OK button 949, and a cancel button 940.

The total magnification of the optical system (the objective lens 2 and the lens system 3 in FIG. 1) is designated in the field for the total magnification 941 of the optical system.

The NA (Numerical Aperture) of the objective lens is designated in the field for the NA 942 of the objective lens.

The pixel size of the image detector 4 is designated in the field for the pixel size 943 of the camera image sensor.

The maximum refractive power of the lens system 3 is designated in the field for the maximum refractive power 944.

The same numerical value as the value in the maximum drive voltage designation field 841 (see FIG. 16) in the above-described lens operation software is designated in the field for the current voltage 945.

A coefficient unique to the lens system 3 is designated in the field for the optical system coefficient 946.

The wavelength of the illumination light used in the pulsed light illuminator 5 is designated in the field for the wavelength 947 of the illumination in use.

A Z-scan range of the lens system 3 (amplitude of the focus-position-variation waveform Mf of the focal length Df shown in FIG. 4), which is automatically calculated based on the values entered in the above-described fields for the total magnification 941 of the optical system to the wavelength 947 of the illumination in use, is displayed in the field for the Z-scan range 948.

When the OK button 949 is pressed, the setting is stored and the optical setting screen 94 is closed.

When the cancel button 940 is pressed, the current process is aborted and the optical setting screen 94 is closed.

Referring back to FIG. 22, the EDOF setting section 920 is provided on the right side of the main screen 90.

A setting for an EDOF processing, which extends the depth of field of the lens system 3 to a desired depth within an optical performance range of the lens system to allow objects at different distances to be focused, is done in the EDOF setting section 920.

The EDOF setting section 920 is provided with an EDOF-enablement check box 921, an EDOF-operation-mode radio button 922, an EDOF-intensity-designation field 923, an EDOF-intensity-designation slider 924, a noise removal checkbox 925, a noise-removal-intensity designation field 926, and a noise-removal-pixel-size designation field 927.

When the EDOF-enablement check box 921 is checked, the EDOF processing is performed on the detected image Im displayed on the image display 902.

The EDOF-operation-mode radio button 922, which is used to designate the EDOF processing to be performed, allows selection between two modes (i.e. a fast mode and a high quality mode).

Intensity of the EDOF processing to be performed is designated using the EDOF-intensity-designation field 923 and the EDOF-intensity-designation slider 924. The intensity of the EDOF processing is designated by directly typing values in the EDOF-intensity-designation field 923 and/or by operating the EDOF-intensity-designation slider 924. The designated EDOF intensity is displayed in the EDOF-intensity-designation field 923. When the EDOF intensity is increased, the contour of the image is emphasized. However, the increase in the EDOF intensity results in an increase in arithmetic processing and consequent increase in time required for the image processing.

When the noise removal checkbox 925 is checked, the noise removal processing is performed on the detected image Im displayed on the image display 902.

In the noise removal processing, a smoothing filter is applied to the pixels of the detected image Im displayed on the image display 902 to smooth the variation in the luminance values of adjacent ones of the pixels, thus removing the noise.

The intensity of the smoothing filter used for the noise removal processing is designated in the noise-removal-intensity designation field 926. The intensity is designated by a selection from a list of High (High), Medium (Med) and Low (Low) in a pull-down menu.

The pixel size used for the noise removal processing is designated in the noise-removal-pixel-size designation field 927. The pixel size is designated by a selection from a list of 3 pixels, 5 pixels, and 7 pixels in a pull-down menu.

According to the above-described exemplary embodiment, while the standing wave is formed in the lens system 3 in response to the drive signal Cf from the lens controller 6 (resonant state), the pulsed light illuminator 5 emits light at a predetermined timing in response to the illumination signal Ci to obtain an image at a desired focal length.

In particular, when the resonance-lock operation unit 711 enables the resonance-lock controller 611, the frequency of the drive signal Cf can be automatically tuned to the peak of the current resonance frequency of the lens system 3 to efficiently form the standing wave.

At this time, the drive signal Cf and the illumination signal Ci can be set or adjusted by the lens operation unit 71. The resonance-lock control is also enabled/disabled by the lens operation unit 71.

In the exemplary embodiment, the lens controller 6 (the drive controller 61, the illumination controller 62 and the image-detection controller 63) is constructed as a dedicated hardware so that the components for directly controlling the operation of the lens system 3 and the pulsed light illuminator 5 (i.e. controlling the frequency and amplitude, controlling the maximum drive voltage and the like) can be concentrated.

On the other hand, the lens controller 6 is controlled using the lens operation unit 71 in a form of the versatile personal computer (the controller PC 7), which runs dedicated software (the lens operation software and the image-processing software) achieve operations for each of the functions and easily allows for modification or the like in accordance with the application of the lens controller.

In the exemplary embodiment, the setting of the frequency and the amplitude of the drive signal Cf and enabling/disabling of the resonance lock, which are often used during the operation of the lens system 3, can be done on the usually displayed main screen 80.

In contrast, the setting of the illumination timing based on the illumination signal Ci (setting of the synchronization output signal control) and the setting of the maximum drive voltage of the drive signal Cf, which are not likely to be changed after once being set, are made on the sub screens (the maximum drive voltage setting screen 84 and the synchronization output signal control screen 86). Accordingly, the screen space can be efficiently used and unintended operation can be prevented.

It should be understood that the scope of the present invention is not limited to the above-described exemplary embodiment(s) but includes modifications and the like as long as the modifications and the like are compatible with the invention.

The lens controller 6 and the controller PC 7, which are used in combination in order to drive and control the lens system 3 in the above exemplary embodiment, may alternatively be an integrated device configured to start, control and operate the lens system 3. In this case, the lens operation software and the image-processing software described in the above exemplary embodiment may be run in the integrated device.

Though the drive signal Cf and the focus-position-variation waveform Mf are sinusoidal in the exemplary embodiment, the drive signal Cf and the focus-position-variation waveform Mf may alternatively have other waveform such as triangular waveform, saw-tooth waveform, rectangular waveform or the like.

The specific structure of the lens system 3 may be altered as necessary. For instance, the case 31 and the oscillator 32 are not necessarily cylindrical but may be hexagonal, and the dimension of the case 31 and the oscillator 32 and the nature of the liquid 35 may be altered as desired.

The lens operation software having the screen interfaces shown in FIGS. 10 to 20 and the image-processing software having the screen interfaces shown in FIGS. 21 to 25 are used in the above-described exemplary embodiment. However, these screen interfaces may be modified in terms of locations of the items in the interface and/or the details of the items.

Figure 26:
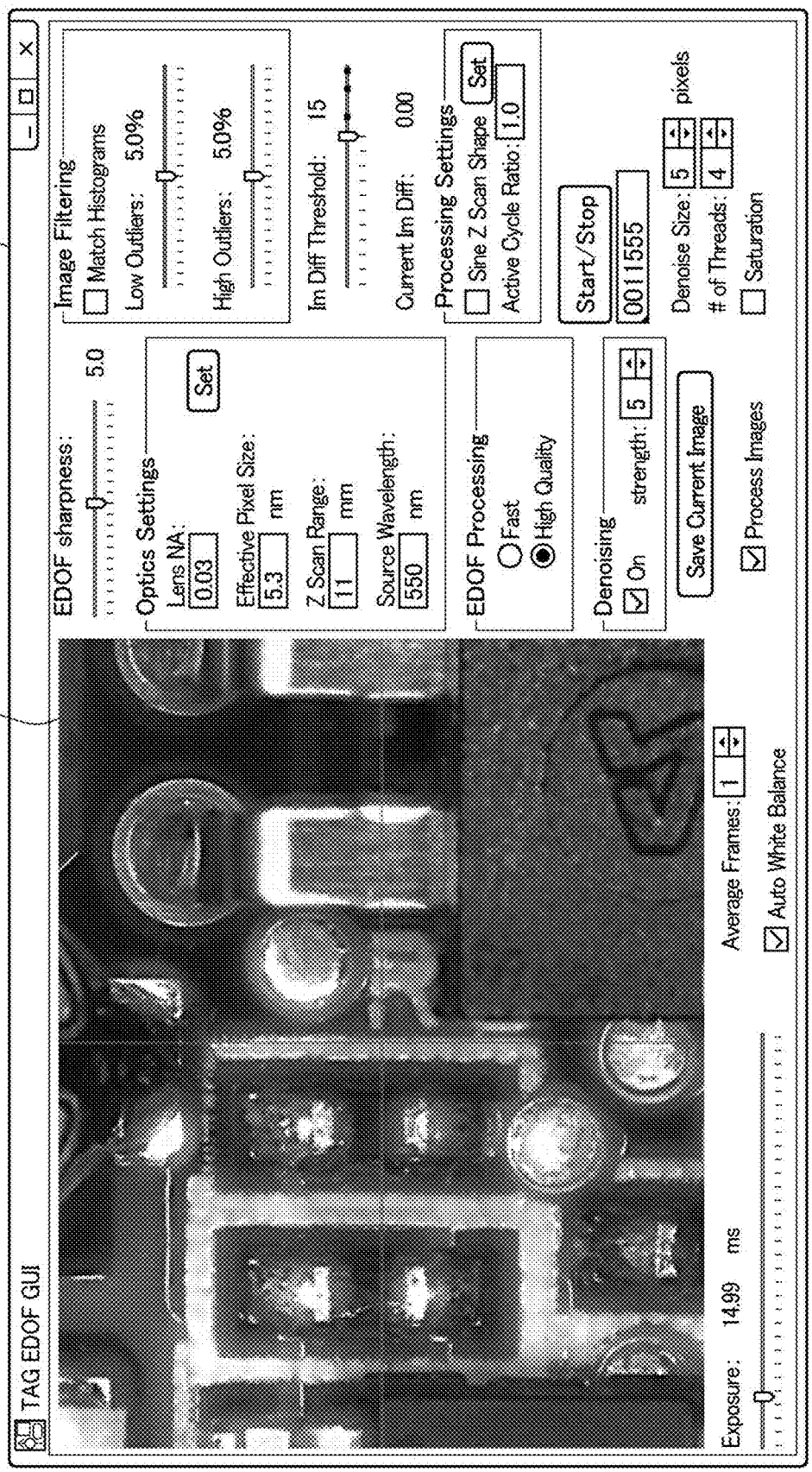
FIG. 26 illustrates a screen of an image-processing software in another exemplary embodiment of the invention.

For instance, an EDOF setting screen 920A may be made independent in the image-processing software as shown in FIG. 26, and various setting items may be provided adjacent to the image display 902A.

What is claimed is:

1. A variable focal length lens device comprising:
    a lens system whose refractive index is variable depending on an inputted drive signal;
    an objective lens disposed in an optical axis common to the lens system;
    an image detector configured to detect an image of a target object through the lens system and the objective lens;
    a lens controller configured to output the drive signal; and
    a lens operation unit configured to adjust a frequency, an amplitude and a maximum drive voltage of the drive signal outputted by the lens controller, wherein
    the lens controller comprises a resonance-lock controller configured to lock the frequency of the drive signal to a variable and temperature-dependent resonance frequency of the lens system, and
    the lens operation unit comprises a resonance-lock operation unit configured to switch enabling and suspending the resonance-lock controller.

2. The variable focal length lens device according to claim 1, wherein
    the lens controller is in a form of a dedicated hardware, and
    the lens operation unit is in a form of a computer system configured to run a dedicated software.

3. The variable focal length lens device according to claim 1, wherein
    the lens operation unit further comprises an operation interface,
    the operation interface comprises a main screen, a setting portion for the frequency and the amplitude of the drive signal, and an operation portion for enabling and suspending the resonance-lock controller, the setting portion and the operation portion being displayed on the main screen, and
    a setting portion for an image-detection timing of the image detector and a setting portion for the maximum drive voltage of the drive signal are each displayed on a sub screen independent of the main screen.

* * * * *